(12) United States Patent
Yamada et al.

(10) Patent No.: US 11,059,293 B2
(45) Date of Patent: Jul. 13, 2021

(54) PRINTER AND NON-TRANSITORY COMPUTER-READABLE MEDIUM STORING INSTRUCTIONS FOR PRINTER DRIVER

(71) Applicant: BROTHER KOGYO KABUSHIKI KAISHA, Aichi (JP)

(72) Inventors: Kazutaka Yamada, Nagakute (JP); Tomoya Oguchi, Aichi (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/565,862

(22) Filed: Sep. 10, 2019

(65) Prior Publication Data
US 2020/0001609 A1    Jan. 2, 2020

Related U.S. Application Data

(62) Division of application No. 15/417,397, filed on Jan. 27, 2017, now Pat. No. 10,434,778.

(30) Foreign Application Priority Data

Jan. 29, 2016    (JP) .................................. 2016-015439

(51) Int. Cl.
*B41J 2/165*    (2006.01)
*H04N 1/00*    (2006.01)

(52) U.S. Cl.
CPC ........ *B41J 2/16505* (2013.01); *H04N 1/0057* (2013.01); *H04N 1/00602* (2013.01);
(Continued)

(58) Field of Classification Search
None
See application file for complete search history.

(56) References Cited

U.S. PATENT DOCUMENTS 6,268,925 B1    7/2001    Yamanaka
2005/0286924 A1*  12/2005  Kurohata ........... G03G 15/5087
                                                              399/82
(Continued)

FOREIGN PATENT DOCUMENTS

JP    H11-5350 A        1/1999
JP    2002-073300 A    3/2002
JP    2013-109510 A    6/2013

OTHER PUBLICATIONS

Official Action dated Jun. 25, 2019 received from the Japanese Patent Office in related application JP 2016-015439.

(Continued)

*Primary Examiner* — Frantz Bataille
(74) *Attorney, Agent, or Firm* — Scully Scott Murphy and Presser

(57) ABSTRACT

A non-transitory computer readable medium storing computer readable instructions configured to, when executed by a processor of a computer, cause the processor to: receive preparation instruction information from an information processing terminal, in response to receiving the preparation instruction information, cause an operating unit to execute at least one pre-printing operation of which operation content accords with a particular execution condition indicated by particular condition information in the preparation instruction information, receive print instruction information from the information processing terminal, the print instruction information instructing execution of the printing operation according to an execution condition, in response to receiving the print instruction information, determine whether the at least one pre-printing operation has already been executed; and in response to determining that the at least one pre- (Continued)

printing operation has been executed, cause the operating unit to execute the printing operation indicated by the print instruction information.

8 Claims, 12 Drawing Sheets

(52) U.S. Cl.
CPC ..... *H04N 1/00623* (2013.01); *H04N 1/00657* (2013.01); *H04N 1/00724* (2013.01); *B41J 2/16517* (2013.01)

(56) References Cited

U.S. PATENT DOCUMENTS

| | | | |
|---|---|---|---|
| 2009/0289990 A1 | | 11/2009 | Kayanaka |
| 2011/0050780 A1* | | 3/2011 | Mizutani ................ B41J 13/103 347/19 |
| 2013/0128309 A1 | | 5/2013 | Higashiura |
| 2017/0272602 A1* | | 9/2017 | Suzuki ................ H04N 1/4433 |

OTHER PUBLICATIONS

Notice of Allowance dated May 20, 2019 issued in U.S. Appl. No. 15/417,397.
U.S. Office Action dated Nov. 14, 2018 issued in U.S. Appl. No. 15/417,397.
Office Action dated Aug. 27, 2019 received from the Japanese Patent Office in related JP 2016-015439 together with an English language translation.
Official Action dated Mar. 3, 2020 received from the Japanese Patent Office in related application JP 2016-015439 together with an English language translation.

* cited by examiner

| PUBLIC INFORMATION | SIZE INFORMATION | A4 |
|---|---|---|
| | COLOR INFORMATION | COLOR |
| PRIVATE INFORMATION | TRAY INFORMATION | TRAY 1 |
| | SHEET INFORMATION | PLAIN PAPER |
| | MARGIN INFORMATION | BORDERED |

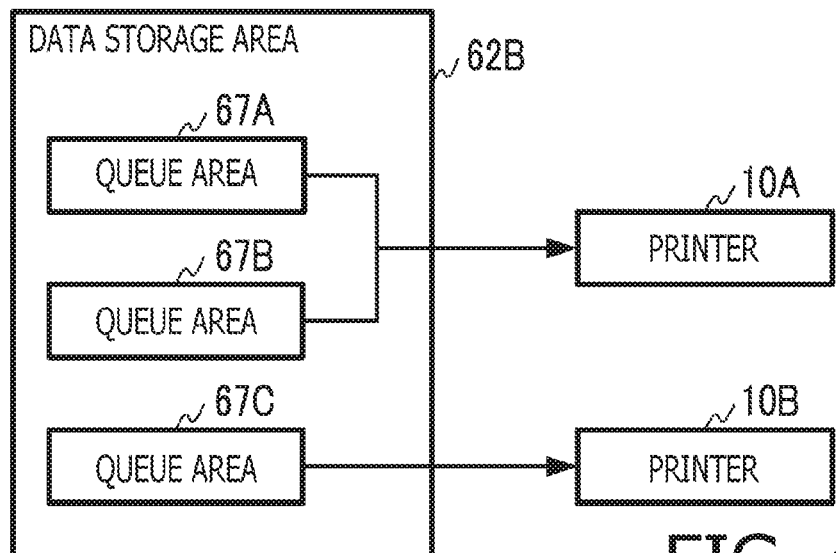

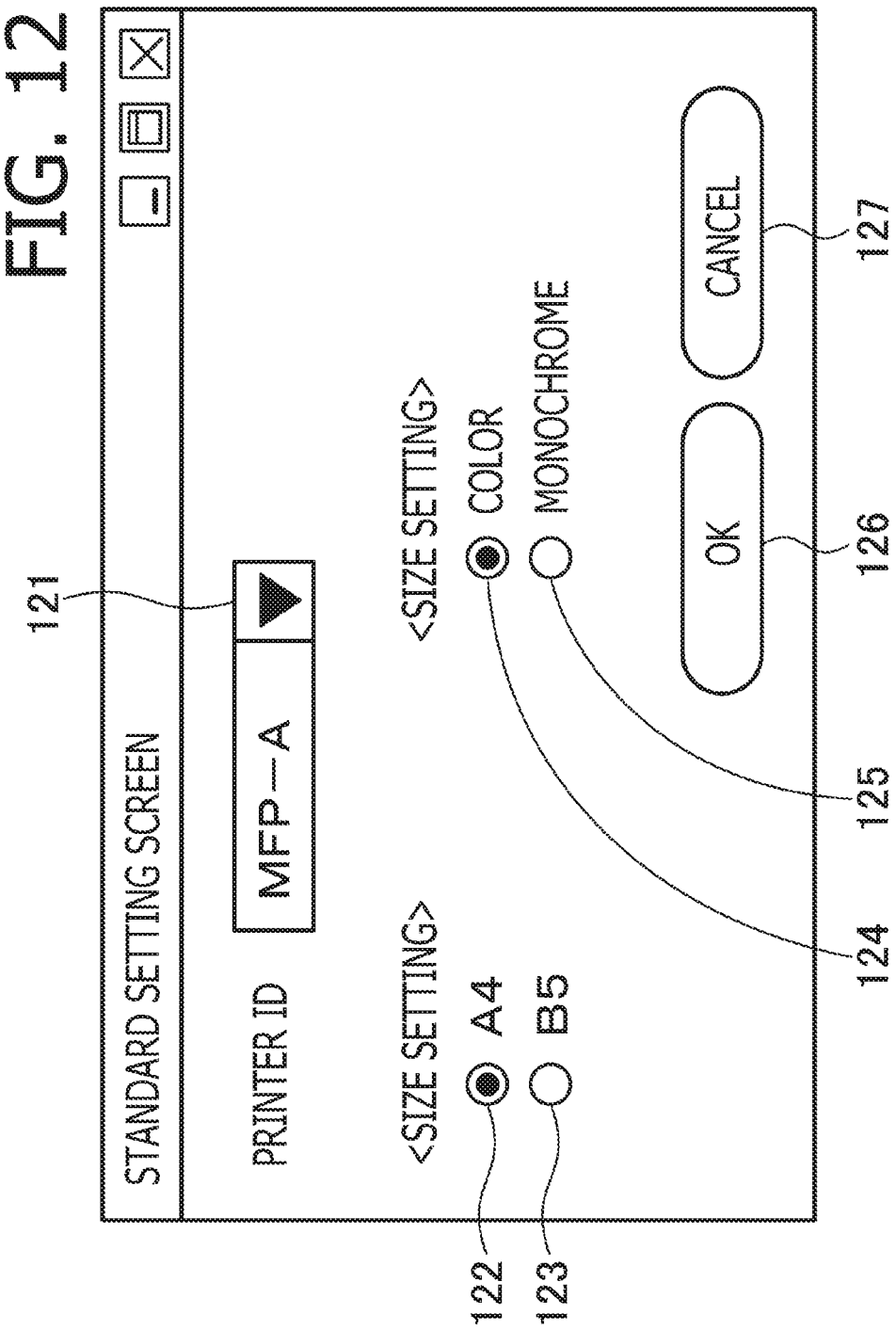

ical Field

Aspects of the present disclosure relate to a computer readable medium containing a program of a computer causing a printer to execute a printing operation, and a printer which executes the printing operation in accordance with instructions from the computer.

Related Art

A program of a computer configured to instruct a printer connected to the computer via a communication network to execute the pre-printing operation prior to instructing the printer to execute the printing operation so that quality of the printing operation is secured has been proposed. For example, the program invoked by an operating system transmits, to the printer, an auto-wakeup command instructing execution of the pre-printing operation in response to the fact that an output port of the printer is in a ready state and an elapsed time from the latest data transmission to the printer is longer than or equal to a defined time.

SUMMARY

However, the above described program transmits the auto-wakeup command to the printer in response to the fact that the above described condition is satisfied, regardless of whether to actually instruct the printer to execute the printing operation. That is, there is a possibility that the printer executes the pre-printing operation even when the printer does not actually execute the printing operation. In such a case, a problem arises that ink and power are wastefully consumed.

Aspects of the disclosure are advantageous in that they provide at least one of a computer readable medium storing instructions capable of letting a printer to execute a pre-printing operation having appropriate operation content, and a printer which executes the pre-printing operation in accordance with instructions from the computer.

According to aspects of the disclosure, there is provided a non-transitory computer readable medium storing computer readable instructions for a driver program, the instructions being configured to, when executed by a processor of a computer having a communication interface, cause the processor to: perform a print instruction receiving process comprising receiving a print instruction from an operating system of the computer, the print instruction indicating that an instruction for instructing a printer to execute a printing operation according to an execution condition designated by a user is input by the user; in response to receiving the print instruction in the print instruction receiving process, perform a preparation instruction process comprising transmitting preparation instruction information to the printer via the communication interface, the preparation instruction information including particular condition information indicating a particular execution condition, the preparation instruction information being information for instructing execution of at least a part of at least one pre-printing operation, the at least one pre-printing operation being executed by the printer to record an image having particular quality in the printing operation, the particular execution condition being the execution condition changing operation content of the at least one pre-printing operation; in response to executing the preparation instruction process, perform a generating process comprising generating print data targeted for the printing operation, based on contents data designated by the user; and perform a print instruction process comprising transmitting print instruction information to the printer via the communication interface, the print instruction information being information for instructing execution of the printing operation according to the execution condition with respect to the print data generated by the generating process.

According to aspects of the disclosure, there is provided a printer, comprising: an operating unit configured to execute an printing operation to record an image on a sheet in accordance with an execution condition and to execute at least one pre-printing operation for recording an image having particular quality on the sheet in the printing operation; a communication interface; and a control device configured to execute a preparation instruction receiving process comprising receiving preparation instruction information from an information processing terminal via the communication interface, the preparation instruction information instructing execution of at least a part of the at least one pre-printing operation, the preparation instruction information including particular condition information indicating a particular execution condition, the particular execution condition being the execution condition changing operation content of the at least one pre-printing operation. The control device is further configured to: in response to receipt of the preparation instruction information in the preparation instruction receiving process, perform a pre-printing process comprising causing the operating unit to execute the at least one pre-printing operation of which the operation content accords with the particular execution condition; perform a print instruction receiving process comprising receiving print instruction information from the information processing terminal via the communication interface, the print instruction information instructing execution of the printing operation according to the execution condition; in response to receipt of the print instruction information in the print instruction receiving process, perform a determination process comprising determining whether the at least one pre-printing operation has already been executed; and in response to determining in the determination process that the at least one pre-printing operation has been executed, perform a print process comprising causing the operating unit to execute the printing operation indicated by the print instruction information.

BRIEF DESCRIPTION OF THE ACCOMPANYING DRAWINGS

Figures 3A, 3B:
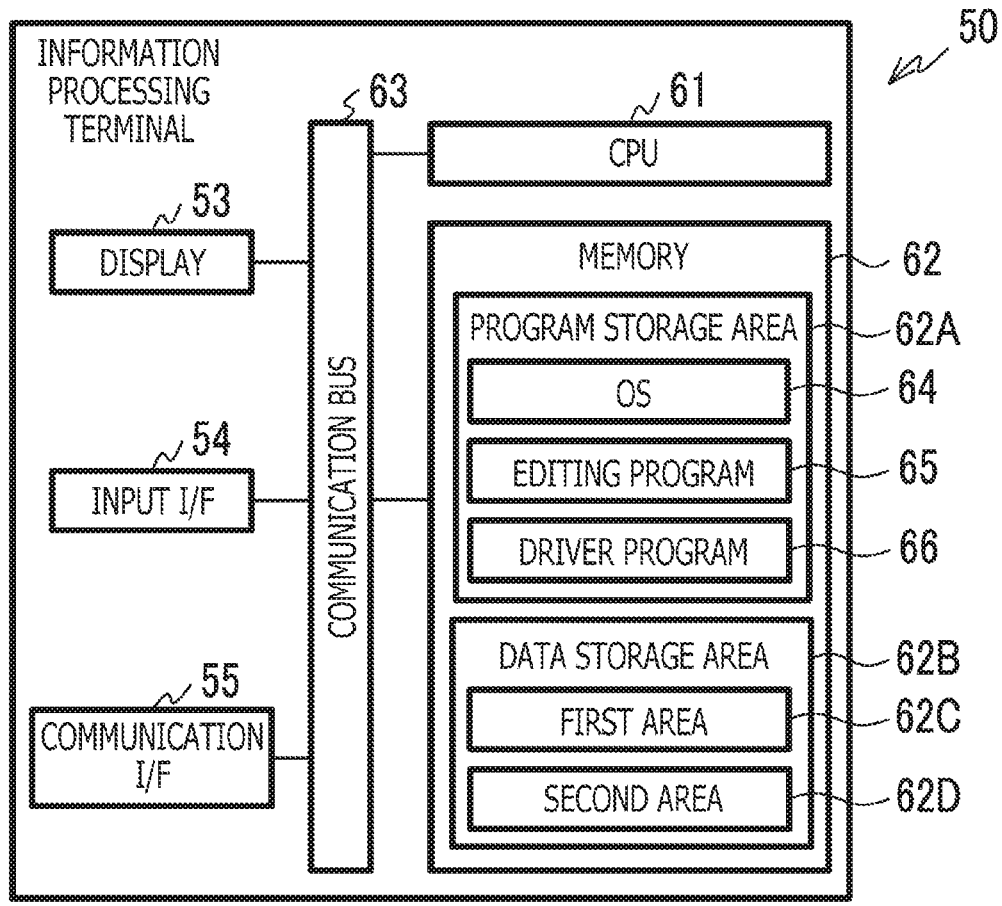
FIG. 3A is a block diagram illustrating a configuration of an information processing terminal in the illustrative embodiment according to one or more of aspects of the present disclosure.

FIG. 3B schematically illustrates condition information stored in a data storage area in the illustrative embodiment according to one or more of aspects of the present disclosure.

FIG. 4A schematically illustrates a relationship between printers and queue areas in the illustrative embodiment according to one or more of aspects of the present disclosure.

FIG. 4B schematically illustrates a queue area in which print instruction information is stored in the illustrative embodiment according to one or more of aspects of the present disclosure.

FIG. 4C schematically illustrates a queue area in which preparation instruction information is stored in the illustrative embodiment according to one or more of aspects of the present disclosure.

Figure 5:
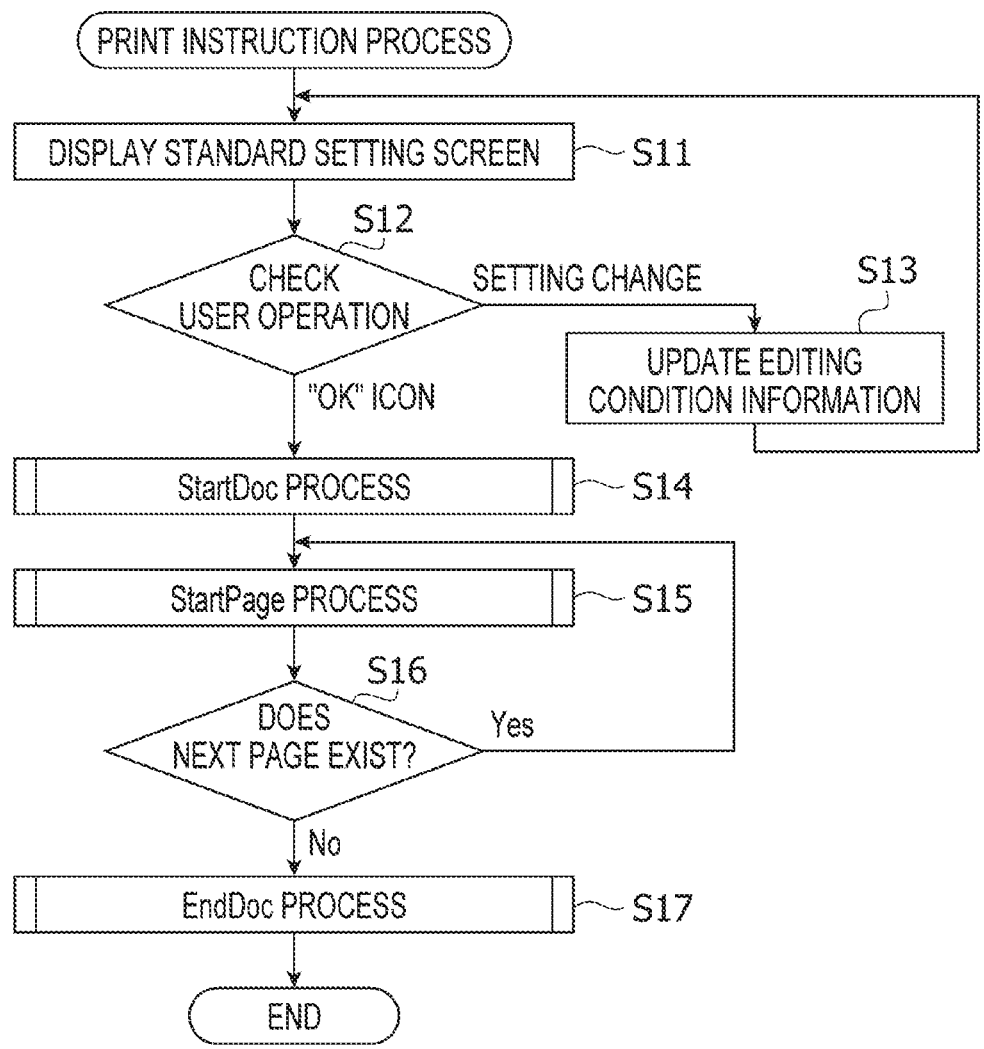

FIG. 5 is a flowchart illustrating a print instruction process in the illustrative embodiment according to one or more of aspects of the present disclosure.

Figure 6:
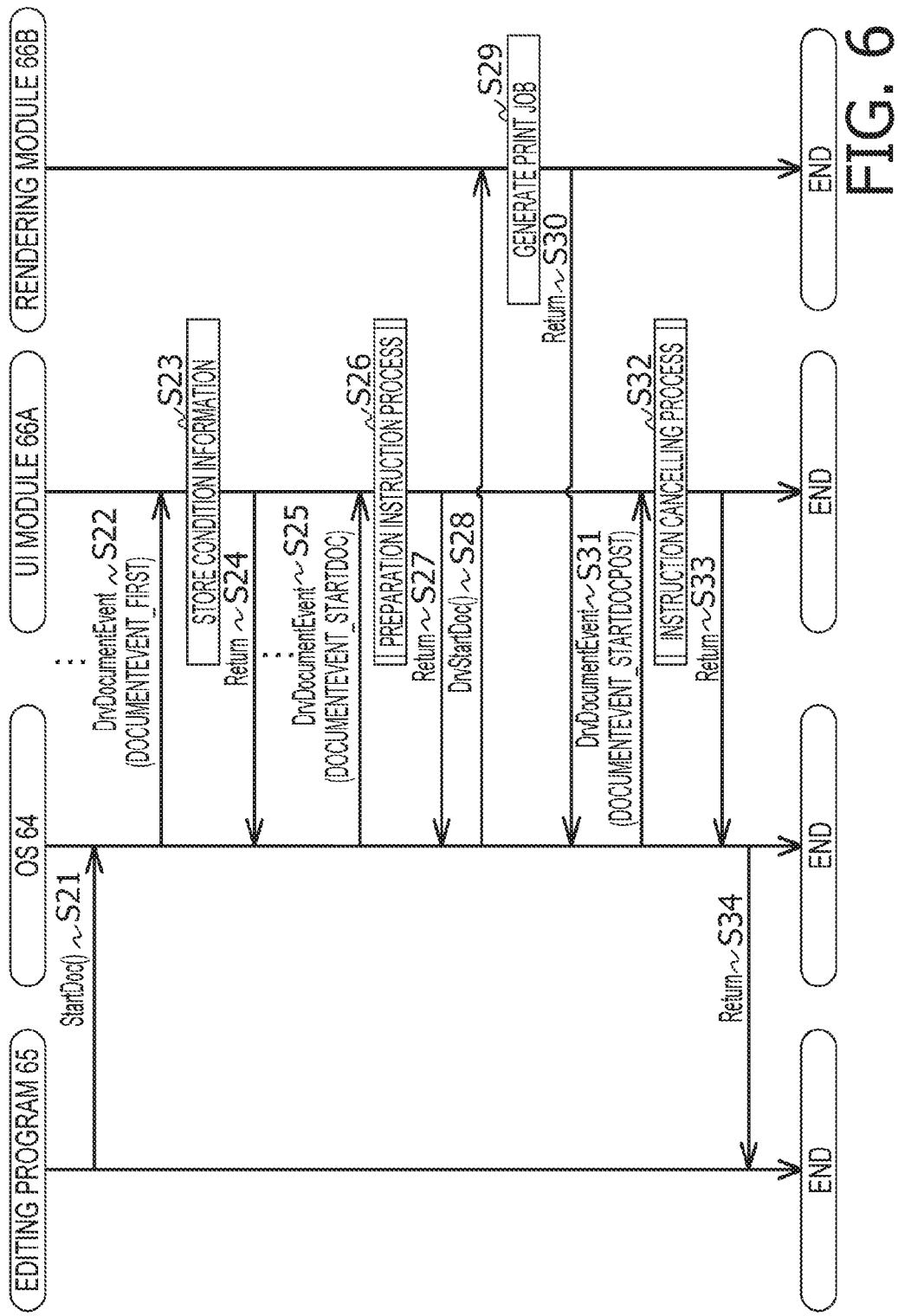

FIG. 6 is a flowchart illustrating a StartDoc process in the illustrative embodiment according to one or more of aspects of the present disclosure.

Figure 7:
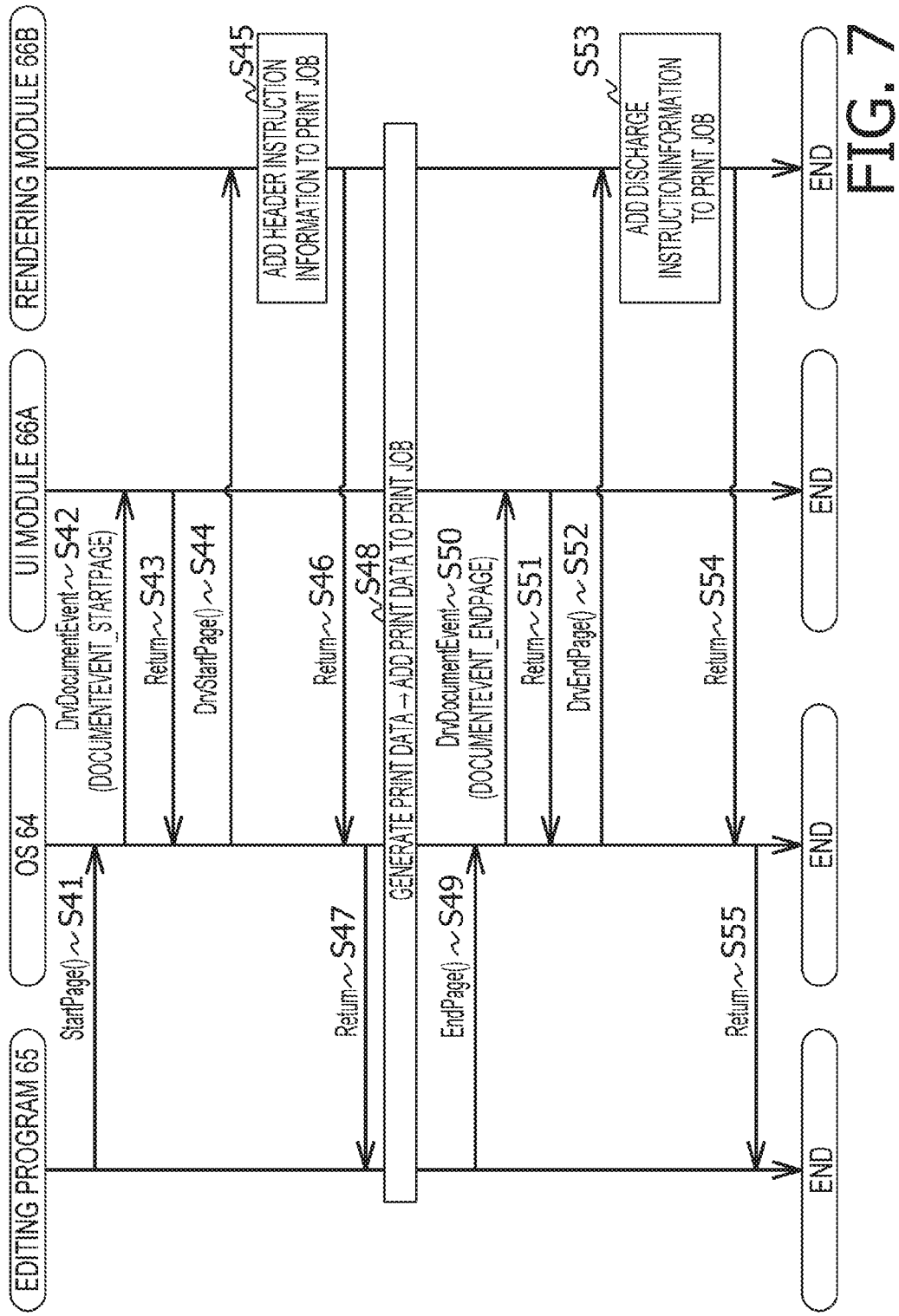

FIG. 7 is a flowchart illustrating a StartPage process in the illustrative embodiment according to one or more of aspects of the present disclosure.

Figure 8:
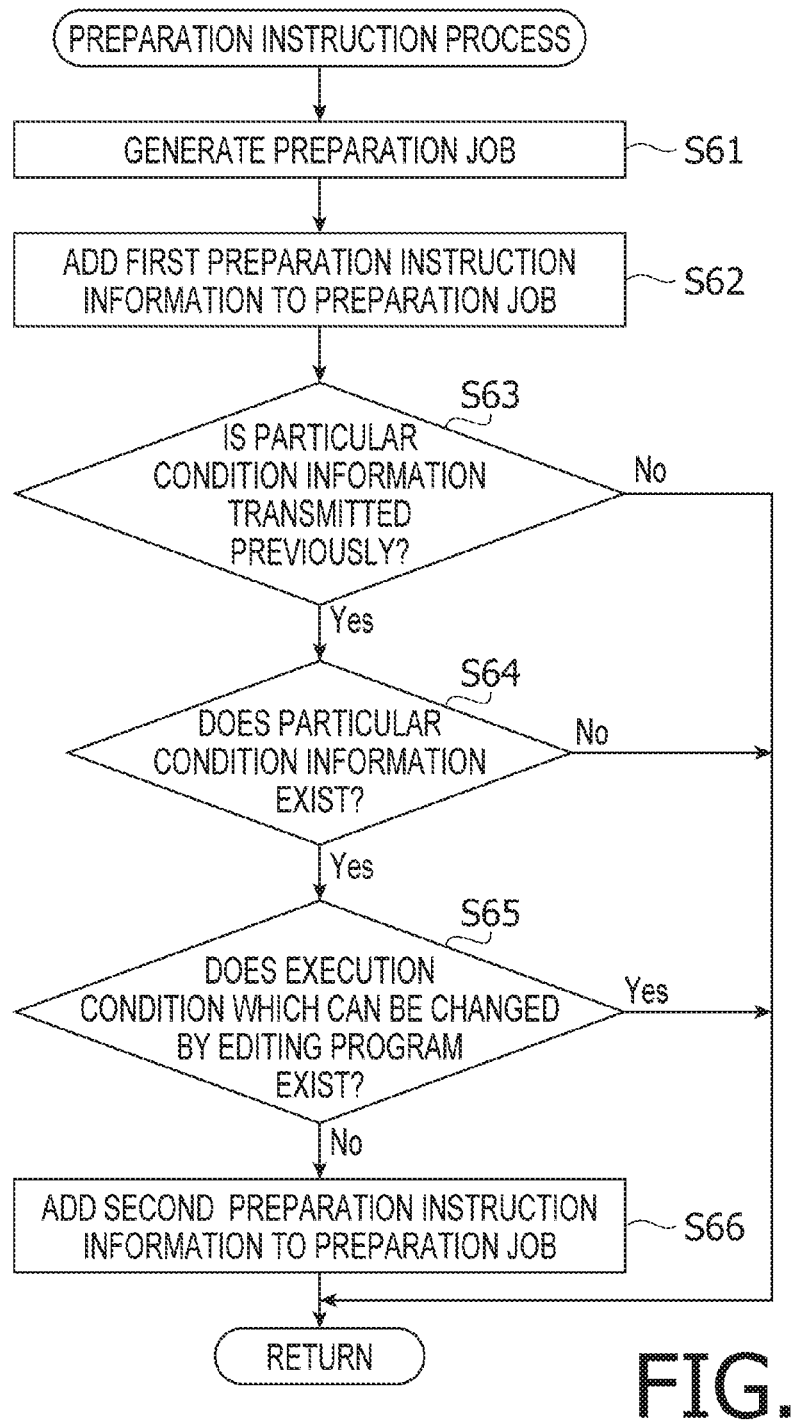

FIG. 8 is a flowchart illustrating a preparation instruction process in the illustrative embodiment according to one or more of aspects of the present disclosure.

Figure 9:
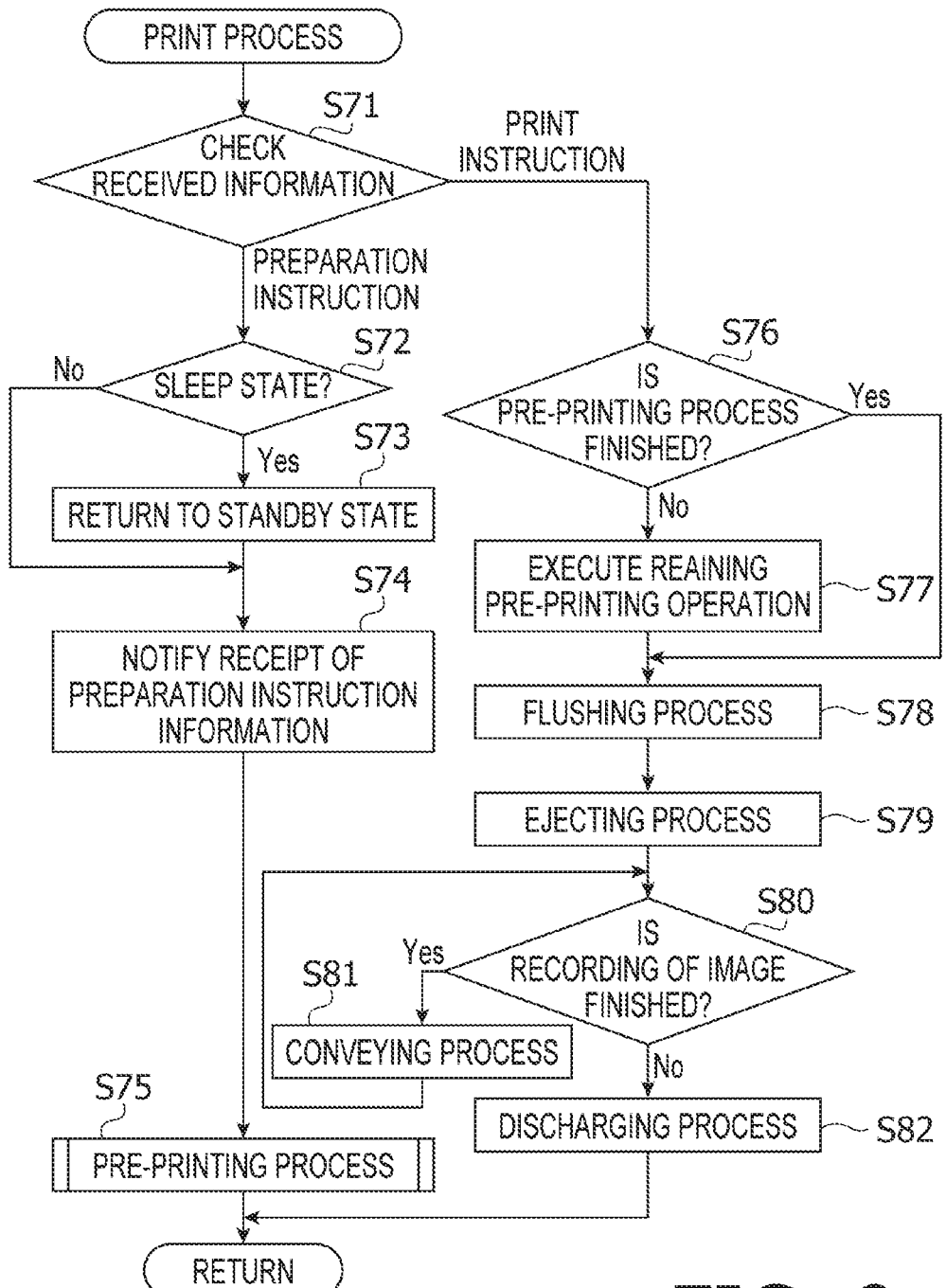

FIG. 9 is a flowchart illustrating a print process in the illustrative embodiment according to one or more of aspects of the present disclosure.

Figure 10:
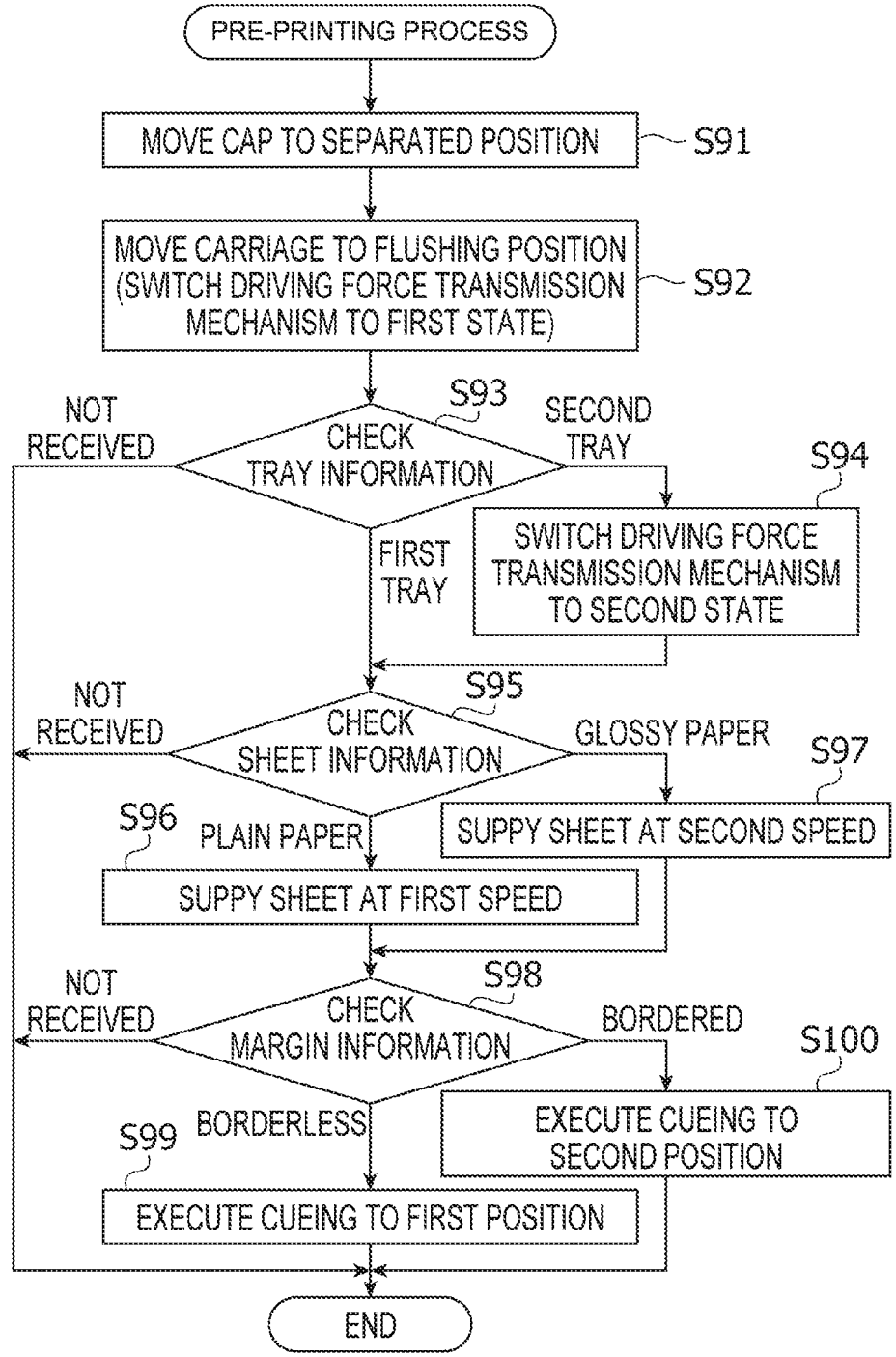

FIG. 10 is a flowchart illustrating a pre-printing process in the illustrative embodiment according to one or more of aspects of the present disclosure.

Figure 11B:
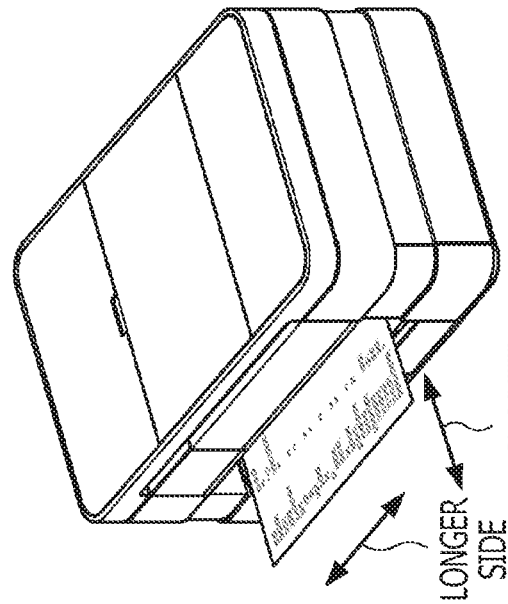
Figure 11A:
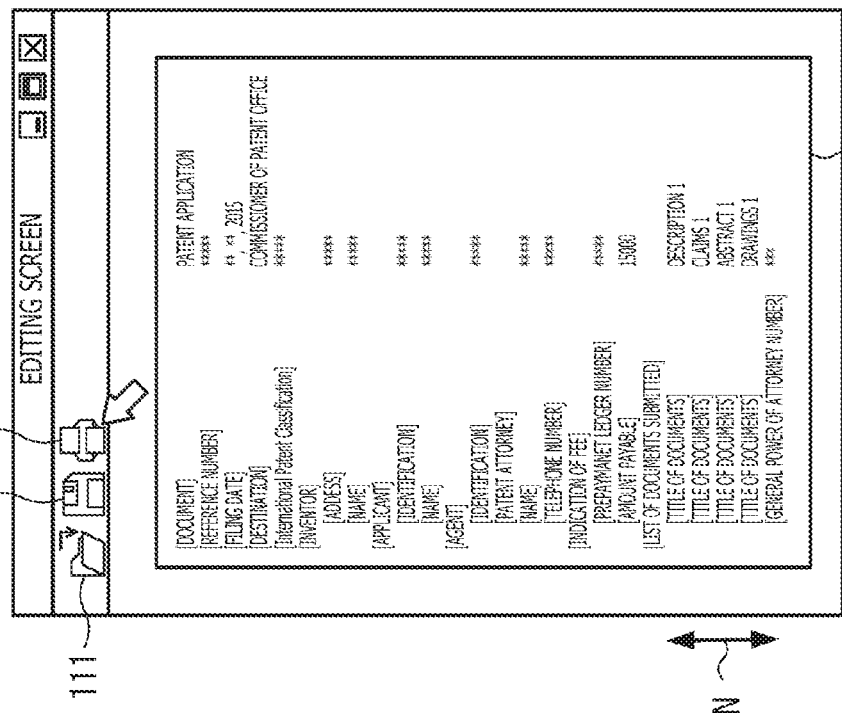

FIG. 11A schematically illustrates an example of an editing screen in the illustrative embodiment according to one or more of aspects of the present disclosure.

FIG. 11B schematically illustrates a situation where a sheet is discharged from the printer in the illustrative embodiment according to one or more of aspects of the present disclosure.

FIG. 12 schematically illustrates an example a standard setting screen in the illustrative embodiment according to one or more of aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereafter, an illustrative embodiment according to aspects of the present disclosure will be described with reference to the accompanying drawings. It is noted that the illustrative embodiment described below is merely an example of the aspects of the present disclosure, and van be varied in various ways. For example, the execution order of various processes described below may be altered.

Figure 1:
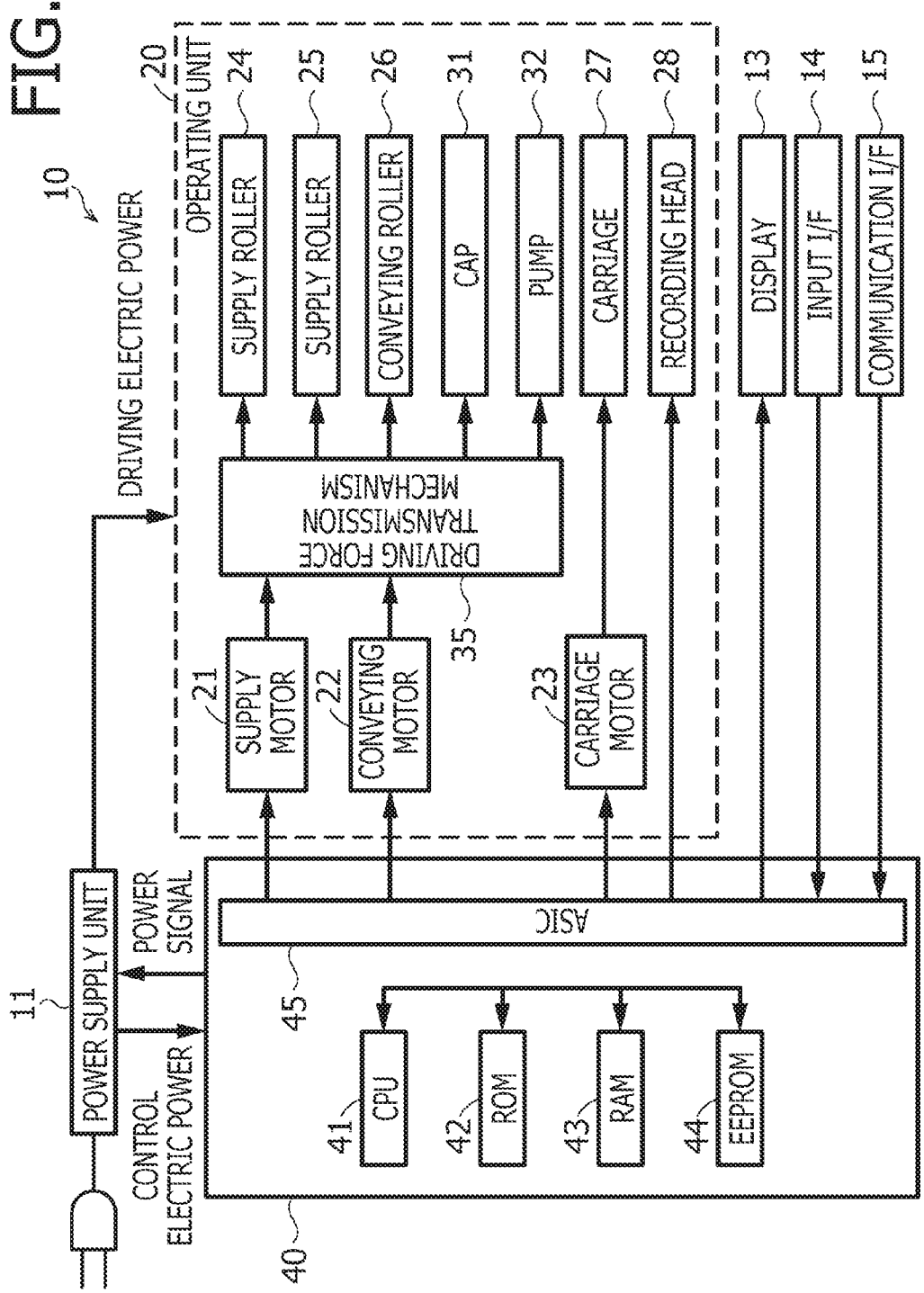
FIG. 1 is a block diagram illustrating a configuration of a printer in an illustrative embodiment according to one or more of aspects of the present disclosure.

A system according to the illustrative embodiment includes, for example, a printer 10 shown in FIG. 1 and an information processing terminal 50 shown in FIG. 3A. The printer 10 and the information processing terminal 50 are configured to be communicable with each other via a communication network. Concrete examples of the communication network include, but not limited to, a wired LAN, a wireless LAN and a USB cable. The information processing terminal 50 may be, for example, communicable with a plurality of printers 10A and 10B as shown in FIG. 4A.

For example, a vender of the printer 10 provides a user with a set including the printer 10 and a driver program 66 which can be installed onto the information processing terminal 50. By letting a user install the driver program 66 onto the information processing terminal 50, the system according to the illustrative embodiment is configured. For example, the driver program 66 may be provided in a form of a CD-ROM or the like included in a package with the printer 10, or may be downloadable via a web site of the vender.

Figure 2:
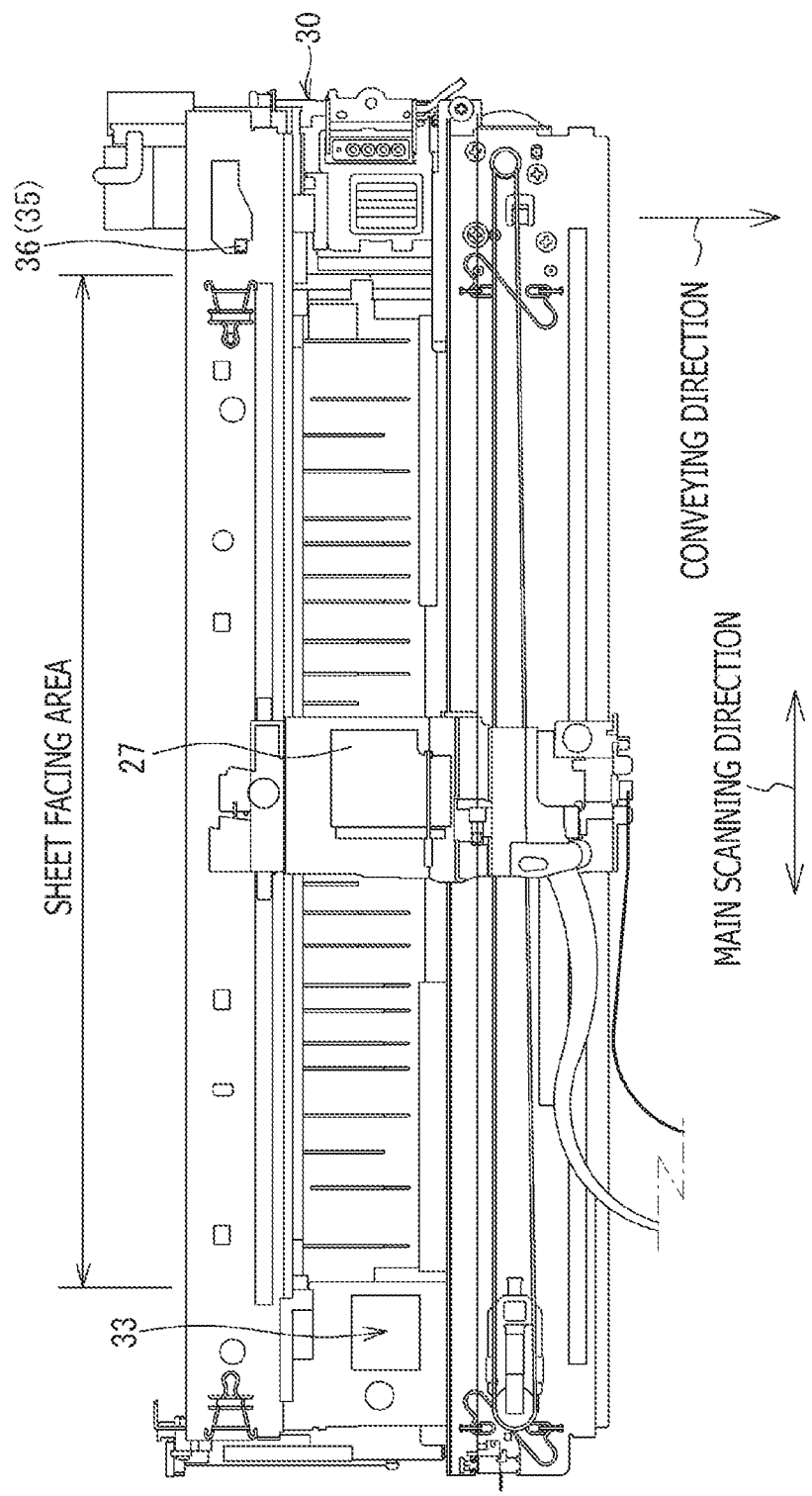
FIG. 2 is a plan view of the printer, illustrating a sheet facing area viewed from the top side, in the illustrative embodiment according to one or more of aspects of the present disclosure.

As shown in FIGS. 1 and 2, the printer 10 includes, as principal components, a power supply unit 11, a display 13, an input I/F 14, a communication I/F 15, an operating unit 20 and a control unit 40. Components constituting the printer 10 are connected each other via a communication bus. Although not shown in the drawings, the printer 10 includes a first supply tray supporting sheets, a second supply tray supporting sheets and a discharge tray supporting sheets on which images have been formed. Although in this illustrative embodiment the printer 10 of an inkjet type is described by way of example, a recording system of the printer 10 is not limited to the inkjet type, but may be another type known in the art, such as, an electrophotographic type. A basic configuration of each of the printers 10A and 10B shown in FIG. 4A may be the same as that of the printer 10 shown in FIGS. 1 and 2.

The power supply unit 11 supplies, to the components in the printer 10, electric power supplied via a power supply plug from an external power source. Specifically, the power supply unit 11 outputs, as a driving electric power (e.g., 24V), electric power obtained from the external power source to the operating unit 20, and outputs, as a control electric power (e.g., 5V), electric power to the control unit 40. Although not shown in the drawings, the power supply unit 11 also supplies electric power to the display 13, the input I/F 14 and the communication I/F 15.

The power supply unit 11 is switchable between a driving state and a sleep state based on a power signal output from the control unit 40. More specifically, the control unit 40 causes the power supply unit 11 to switch from the sleep state to the driving state by outputting the power signal of a high level (e.g., 5V). Further, the control unit 40 causes the power supply unit 11 to switch from the driving state to the sleep state by outputting the power signal of a low level (e.g., 0V).

The driving state means a state where the power supply unit 11 outputs the driving electric power to the operating unit 20. In other words, the driving state is a state where the operating unit 20 is able to operate. The sleep state means a state where the power supply unit 11 does not output the driving electric power to the operating unit 20. In other words, the sleep state is a state where the operating unit 20 is not able to operate. On the other hand, regardless of whether the state is the driving state or the sleep state, the power supply unit 11 outputs the control electric power to the control unit 40. Although not shown in the drawings, regardless of whether the power supply unit 11 is in the driving state or the sleep state, the input I/F 14 is able to output an operation signal according to a user operation. Further, regardless of whether the power supply unit 11 is in the driving state or the sleep state, the communication I/F 15 is able to receive information from an external device.

The display 13 is, for example, a liquid crystal display or an organic EL display, and includes a display surface on which various types of information are displayed.

The input I/F 14 is a user interface through which an input operation by a user is received. Specifically, the input I/F 14 includes buttons, and outputs various operation signals respectively corresponding to pressed buttons to a CPU 41. The input I/F 14 may include a membrane touch sensor laminated on the display surface of the display 13. An operation to designate an object displayed on the display surface of the display 13 or an operation to input a character string or a number string is an example of a user operation. The term "object" means, for example, a character string, an icon, a button or a link displayed on the display 13.

The input I/F configured as a touch sensor 14 outputs position information indicating a position at which a user touches the display surface. The term "touch" as used herein generally includes operations for letting an inputting media contact the display surface. The concept of the term "touch" may further include letting the input medium be placed at a position very close to the display surface, although in this case the input medium does not actually contact the display surface. The inputting medium may be a finger of a user, or may be a touch pen and the like. A user operation to tap a position of an icon displayed on the display 53 is an example of a designating operation to designate the icon.

The communication I/F 15 is an interface communicable with an external device via a communication network. That is, the printer 10 outputs various types of information to the external device via the communication I/F 15, and receives various types of information from the external device via the communication I/F 15. For example, the communication I/F 15 may exchange wireless signals according to a communication protocol based on Wi-Fi (trademark), or may be an interface to which a LAN cable or a USB cable is connected.

The operating unit 20 executes the printing operation and the pre-printing operation in accordance with an instruction from the control unit 40. The printing operation is the operation for recording an image on a sheet. The pre-printing operation is the operation to be executed in advance of the printing operation so that an image having a particular degree of quality is recorded on a sheet during the printing operation. Details about the printing operation and the pre-printing operation are described later. As shown in FIGS. 1 and 2, the operating unit 20 includes, as principal components, a supply motor 21, a conveying motor 22, a carriage motor 23, supply rollers 24 and 25, a conveying roller 26, a carriage 27, a recording head 28, a maintenance mechanism 30, an ink receiving unit 33 and a driving force transmission mechanism 35.

The supply roller 24 supplies a sheet supported on the first supply tray to a position at which the sheet reaches the conveying roller 26 via a conveying path (not shown). The supply roller 25 supplies a sheet supported on the second supply tray to a position at which the sheet reaches the conveying roller 26 via a conveying path (not shown). The supply rollers 24 and 25 are rotated by a rotational driving force of the supply motor 21 transmitted via the driving force transmission mechanism 35. It should be noted that, in this illustrative embodiment, at least a part of the conveying path provided to extend from the first supply tray or the second supply tray to the conveying roller 26 is curved.

The conveying roller 26 conveys the sheet supplied by the supply roller 24 or 25 in a conveying direction toward a sheet facing area shown in FIG. 2. The sheet facing area is an area extending in a main scanning direction, and, in the sheet facing area, the sheet and the carriage 27 could face with each other. The conveying direction and the main scanning direction are perpendicularly intersecting with each other. The conveying roller 26 conveys the sheet on which an image has been recorded by the recording head 28, in the conveying direction toward a discharge tray. The conveying roller 26 is rotated by a rotational driving force of the conveying motor 22 transmitted via the driving force transmission mechanism 35. The conveying roller 26 may be formed of a plurality of rollers.

As shown in FIG. 2, the carriage 27 moves in the main scanning direction in an area including the sheet facing area. More specifically, the carriage 27 moves between a cap position deviating rightward from the sheet facing area in the main scanning direction and a flushing position deviating leftward from the sheet facing area in the main scanning direction. The carriage 27 moves while receiving the rotational driving force from the carriage motor 23. The recording head 28 is mounted on the carriage 27. On a lower surface (hereafter, referred to as a "nozzle surface") of the recording head 28, a plurality of nozzles are formed. By letting driving elements, such as piezoelectric elements, vibrate, the recording head 29 ejects ink from the nozzles.

During a process where the carriage 27 moves in the main scanning direction from one side to the other side, ink drops are ejected from the recording head 28 to a recording area of the sheet positioned in the sheet facing area. As a result, an image is recorded on the sheet. The sheet is divided into a plurality of recording sections adjoining to each other in a shorter side direction of the sheet. During the printing operation described later, the operating unit 20 sequentially records images in the plurality of recording sections, respectively.

The maintenance mechanism 30 performs maintenance for the recording head 28. More specifically, the maintenance mechanism 30 executes so-called purging operation for sucking ink in the nozzles. As shown in FIG. 2, the maintenance mechanism 30 is disposed at a position deviating rightward in the main scanning direction from the sheet facing area. As shown in FIG. 1, the maintenance mechanism 30 includes, as principal components, a cap 31 and a pump 32.

The cap 31 is disposed at a position facing the recording head 28 mounted on the carriage 27 positioned at the cap position. The cap 31 is configured to be movable between a covering position and a separated position which are separated from each other in the up and down direction. The cap 31 positioned at the covering position closely contacts the recording head 28 of the carriage 27 positioned at the cap position to cover the nozzle surface. At the separated position, the cap 31 is separated from the nozzle surface. An elevating mechanism (not shown) moves the cap 31 between the covering position and the separated position through use of the rotational driving force of the supply motor 21 transmitted via the driving force transmission mechanism 35. The pump 32 sucks ink in the nozzles via the cap 31 at the covering position, and discharges the sucked ink to a wasted ink tank (not shown). The pump 32 is driven by the rotational driving force of the conveying motor 22 transmitted via the driving force transmission mechanism 35.

The transmission mechanism 35 transmits the driving forces of the supply motor 21 and the conveying motor 22 to the supply rollers 24 and 25, the conveying roller 26, the elevating mechanism for the cap 31 and the pump 32. The driving force transmission mechanism 35 is configured as a combination of all of or a part of a toothed wheel, a pulley, a ring-shaped endless belt, a pendulum gear mechanism, a one way clutch and the like. Transmission destinations to which the driving forces of the supply motor 21 and the conveying motor 22 are transmitted by the driving force transmission mechanism 35 are switched by the carriage 27. The driving force transmission mechanism 35 is configured to be switchable between a first state, a second state and a third state whose transmission destinations of the driving force are different from each other.

The first state is a state where the driving force of the supply motor 21 is transmitted to the supply roller 24 and is not transmitted to the supply roller 25 and the elevating mechanism for the cap 31. The second state is a state where the driving force of the supply motor 21 is transmitted to the supply roller 25 and is not transmitted to the supply roller 24 and the elevating mechanism for the cap 31. The third state is a state where the driving force of the supply motor 21 is transmitted to the elevating mechanism for the cap 31 and is not transmitted to the supply rollers 24 and 25. Further, in the first state and the second state, the driving force of the conveying motor 22 is transmitted to the conveying roller 26 and is not transmitted to the pump 32. In the third state, the driving force of the conveying motor 22 is transmitted to both of the conveying roller 26 and the pump 32.

As shown in FIG. 2, the driving force transmission mechanism 35 includes a sliding member 36 formed to extend to a position at which the sliding member 36 can contact the carriage 27. The sliding member 36 is moved in the main scanning direction while contacting or being separated from the carriage 27. The status of the driving force transmission mechanism 35 is switched by the sliding member 36 moving in the main scanning direction. More specifically, by letting the sliding member 36 move in the main scanning direction, an engaging state of gears constituting the driving force transmission mechanism 35 changes.

When the carriage 27 moved rightward to the cap position contacts the sliding member 36, the driving force transmission mechanism 35 is switched to the third state. Further, when the carriage 27 moved leftward from the cap position is separated from the sliding member 36, the driving force transmission mechanism 35 is switched from the third state to the first state. Further, when the carriage 27 moved rightward to the front of the cap position contacts the sliding member 36, the driving force transmission mechanism 35 is switched from the first state to the second state. It should be noted that the driving force transmission mechanism 35 according to the illustrative embodiment cannot be directly switched from the third state to the first state.

The control unit 40 totally controls operations of the printer 10. As shown in FIG. 1, the control unit 40 is a microcomputer including, as principal components, a CPU 41, a ROM 42, a RAM 43, an EEPROM 44 an ASIC 45.

In the ROM 42, programs for causing the CPU 41 to control operations of the printer 10 are stored. The RAM 43 is used as a memory area or a work area in which various types of data used for execution of programs by the CPU 41 is temporarily stored. In the EEPROM 44, settings, flags and the like to be held after power is turned off are stored. By reading the programs from the ROM 42 and executing the programs, the CPU 41 controls the operations of the printer 10. To the ASIC 45, the display 13, the input I/F 14, the communication I/F 15, the supply motor 21, the conveying motor 22, the carriage 23 and the recording head 28 are connected. The ASIC 45 causes the components in the printer 10 to operate according to instructions from the CPU 41.

The ROM 42, the RAM 43 and the EEPROM 44 may be non-transitory computer-readable media. The non-transitory computer-readable media may include recording medium such as a CD-ROM and a DVD-ROM as well as the RAM, the ROM, the EEPROM, and the like. The non-transitory computer-readable medium may be a tangible medium. It is noted that the non-transitory computer-readable medium does not include any electric signal such as a carrier wave for carrying a program downloaded from a server on the Internet. The same applies to a memory 62 of the information processing terminal 50 which is described later.

The ASIC 45 outputs driving signals to the motors 21, 22 and 23. When the motors 21, 22 and 23 rotate, the rollers 24, 25 and 26 convey the sheet, and the carriage 27 moves in the main scanning direction. The ASIC 45 outputs the driving signal to the driving elements such as piezoelectric elements. When the driving signal oscillates, the recording head 28 ejects ink drops from the nozzles. The ASIC 45 outputs an image signal to the display 13 to display an image on the display 13. The ASIC 45 obtains an operation signal output from the input I/F 14. The ASIC 45 receives information from an external device via the communication I/F 15, and transmits information to an external device via the communication I/F 15. Furthermore, to the ASIC 45, various sensors know in the art are connected. Based on detected signals output from the various sensors, the control unit 40 detects, for example, the position of the sheet conveyed by the conveying roller 26, the position of the carriage 27 and the position of the cap 31.

As shown in FIG. 3A, the information processing terminal 50 includes, as principal components, an input I/F 54, a communication I/F 5, a CPU 61, a memory 62 and a communication bus 63. Since the display 53, the input I/F 54, the communication I/F 55, and the CPU 61 provided in the information processing terminal 50 have substantially the same configurations as the display 13, the input I/F 14, the communication I/F 55 and the CPU 41 provided in the printer 10, respectively, explanations thereof are omitted.

The information processing terminal 50 is, for example, a mobile phone, a smartphone, a tablet terminal, or a PC. The information processing terminal 50 is an example of a computer. The input I/F 54 of the information processing terminal 50 may be, for example, a combination of a keyboard and a mouse. In this case, a user operation to move a mouse pointer to a position of an icon displayed on the display 53 and then to click the icon is an example of a designating operation for designating the icon.

The memory 62 is, for example, a RAM, a ROM, an EEPROOM, an HDD, a portable storage medium, such as a USB memory, detachably attachable to the information processing terminal 50, and a buffer provided in the CPU 61, or a combination thereof. The memory 62 includes a program storage area 62A and a data storage area 62B. In the area 62A, an OS 64, an editing program 65, and a driver program 66 are installed. Each of the programs stored in the area 62A may be a single program or a combination of a plurality of programs. In the area 62B, data or information required to execute the programs are stored.

In this illustrative embodiment, Windows (trademark) Operating System is explained as a concrete example of the OS 64; however, a concrete example of the OS 64 is not limited to such an example. For example, Android (trademark) OS, or iOS (trademark) may be used.

The editing program 65 is a program for editing contents data according to an user operation. As shown as an example in FIG. 11A, the editing program 53 causes the display 53 to display an image represented by designated contents data, receives a user operation to instruct editing of the contents data via the input I/F 54, and edits the contents data according to the received user operation. As formats of the contents data, for example, a text format, an image format, a spreadsheet format and a presentation format are cited. The contents data may include more than one page data. The page data means data representing contents recorded on one sheet.

The driver program 66 is a program for causing the printer 10 to execute the print operation according to the print instruction received from the OS 64. As shown in FIGS. 6 and 7, the driver program 66 according to the illustrative embodiment includes a UI module 66A which is an example of a first module and a rendering module 66B which is an example of a second module. The driver program 66 may be formed of a single module or may additionally include another module. The driver program 66 may be configured to be able to instruct the printing operation with respect to the printer 10 of a single model, or may be configured to be able to instruct the printing operation with respect to the printers 10 of a plurality of models.

In the driver program 66, a plurality of functions designated by the OS 64 are defined. By letting the OS 64 call the plurality of functions in particular order, the driver program 66 is able to cause the printer 10 to execute the printing operation. A print instruction according to the illustrative embodiment means, for example, the fact that a first function "DrvDocument Event( )" defined in the UI module 66A is called by the OS 64 while using a constant "DOCUMENTEVENT_STARTDOC" as an argument.

As shown in FIG. 3A, the area 62B includes a first area 62C and a second area 62D. The first area 62C is, for example, a s-called registry which is a database for basic information concerning the OS 64 or setting information of driver programs. A reference procedure for referring to the information stored in the first area 62C is defined by the OS 64. The OS 64 guarantees appropriateness of the information referred to according to the reference procedure, and does not guarantee appropriateness of the information referred to not according to the reference procedure. By contrast, information stored in the second area 62D can be referred to without complying with a reference procedure like the above described reference procedure, but can be refereed to at desired timings. In the following, when expressed as "a program stores information in the area 62B", this type of expression means that the information is in principle stored in the second area 62D. In the following, an example of the reference procedure for the information stored in the first area 62C is explained.

As an example, the editing program 65 secures a particular memory area in the second area 62D. Then, the editing program 65 calls a readout function defined in the OS 64 using, as an argument, a first pointer "DEVMODE" indicating a top address of the secured memory area. The OS 64 copies the information stored in the first area 62C to the memory area indicated by the first pointer "DEVMODE". As a result, the editing program 65 becomes able to read or edit the information copied from the first area 62C to the memory area indicated by the first pointer "DEVMODE".

As another example, in the driver program 66, a function (e.g., a first function "DrvDocumentEvent( )") defined by the OS 64 is defined. The OS 64 calls the first function using, as arguments, a constant "DOCUMENTEVENT_FIRST" and a second pointer. The second pointer indicates a top address of a memory area in which the information stored in the first area 62C is stored or a top address of a memory area in which the information copied from the first area 62C to the second area 62D is stored. The driver program 66 is able to read or edit the information stored in the memory area indicated by the second pointer as the information stored in the first area 62C. In this illustrative embodiment, the fact that the first function is executed while designating, as arguments, the constant "DOCUMENTEVENT_FIRST" and the second pointer may be expressed as an reference instruction for allowing reference to information stored in the first area 62C.

As shown as an example in FIG. 3B, the first area 62C stores condition information. The condition information is information indicating an execution condition for the printing operation to be executed by the printer 10. The condition information according to the illustrative embodiment includes size information, color information, tray information, sheet information, margin information, a secure flag, and authentication information. However, concrete examples of the condition information are not limited to the examples shown in FIG. 3B.

The condition information is stored in the first area 62C at a timing when the driver program 66 is installed. The driver program 66 is able to change the condition information stored in the first area 62C according to an instruction from a user. More specifically, the driver program 66 reads the condition information from the first area 62C according to the reference instruction from the OS 64, and displays the read condition information on the display 53. Then, in response to receipt of a user operation to change the condition information via the input I/F 54, the driver program 66 overwrites the condition information stored in the first area 62C with the changed condition information.

The condition information includes public information and private information. The public information is information which can also be edited through another program (e.g., the editing program 65) installed in the information processing terminal 50. The private information is information which cannot be edited through another program installed in the information processing terminal 50. In other words, the private information is information which only the driver program 66 is able to edit. In the example of FIG. 3B, the size information and the color information are the public information, and the tray information, the sheet information and the margin information are the private information.

The size information indicates the size (e.g., "A4", "B5", etc.) of the sheet to be used for the print operation. The color information is the number of inks (e.g., "color", "monochrome", etc.) used for the print operation. The tray information indicates one of a plurality of trays (e.g., "Tray 1", "Tray 2", etc) provided in the printer 10. "Tray 1" corresponds to the first supply tray of the printer 10, and "Tray 2" corresponds to the second supply tray of the printer 10. The sheet information indicates the type of sheet (e.g., "plain paper", "glossy paper", etc.) used for the printing operation. The margin information indicates whether to set a margin having a particular width in an outer peripheral portion of the sheet (e.g., "Bordered", "Borderless", etc.

A data structure of the public information is defined in the OS 64, but FIG. 3B illustrates only representative items. On the other hand, a data structure of the private information may differ according to the printer 10 or may differ according to the driver program 66. In the following, there are cases where the execution condition indicated by the public information is referred to as a "public condition" and the execution condition indicated by the private information is referred to as a "private condition".

As shown in FIG. 4A, the area 62B includes more than one queue areas 67A, 67B and 67C. The queue areas 67A to 67C are memory areas in which information to be transmitted to the printers 10A and 10B are stored. The queue areas 67A to 67C are associated with so-called printer ports specifying the printer 10A and 10B. Specifically, in the queue areas 67A and 67B, information to be transmitted to the printer 10A is stored. In the queue area 67C, information to be transmitted to the printer 10B is stored. For example, for the driver program 66, the queue areas 67A to 67C in which the information should be stored are designated as arguments of a function from the OS 64. In the following, there is a case where the queue areas 67A to 67C designated for the driver program 66 is referred to as a "designated queue".

In the queue areas 67A to 67C, information used to instruct the printers 10A and 10B to execute various operations is stored. More specifically, in the queue areas 67A to 67C, the print instruction information shown in FIG. 4B, preparation instruction information shown in FIG. 4C, status transmission instruction information (not shown), etc. are stored. The print instruction information is information for instructing execution of the printing operation, and includes supply instruction information, cueing instruction information, conveying instruction information, ejecting instruction information and discharge instruction information. The preparation instruction information is information for instructing execution of the pre-printing operation. The status transmission instruction information (not shown) is information for instructing transmission of status information indicating statuses of the printer 10A and 10B. However, concrete examples of the information stored in the queue areas 67A to 67C are not limited to the above described information.

The queue area 67A is an area in which information which the OS 64 transmits to the printer 10A via the communication I/F 55 is stored in a state where the transmission order is specified. In other words, the OS 64 checks, at particular timings, whether the instruction information is stored in the queue area 67A. Then, in response to determining that the instruction information is stored in the queue area 67A, the OS 64 transmits the instruction information to the printer 10 via the communication I/F 55 in the transmission order defined in advance, and deletes the transmitted instruction information from the queue area 67A. The same applies to the queue areas 67B and 67C.

More specifically, as shown in FIGS. 4B and 4C, to the instruction information stored in the queue area 67A, a Job ID is added. The job ID is information for specifying the instruction information to be transmitted successively. That is, there is a case where the same job ID is added to a plurality of instruction information. The OS 64 transmits the plurality of instruction information, to which the same job ID is added, in the order that the information is stored in the queue area 67A. Furthermore, the OS 64 transmits the instruction information, to which the job IDs different from each other are added, in the order that the job ID is generated.

For example, in the queue area 67A shown in FIG. 4B, the OS 64 transmits the conveying instruction information, the ejecting instruction information and the discharge instruction information, to which the job ID "CONTENTS DATA A" is added, in this order. Then, the OS 64 transmits the supply instruction information and the cueing instruction information, to which the job ID "CONTENTS DATA B" is added, in this order. In this case, even when the supply instruction information to which the job ID "CONTENTS DATA B" is added is stored in the queue area 67A prior to storing of the discharge instruction information to which the job ID "CONTENTS DATA A" is added, the discharge instruction information is transmitted earlier. That is, a plurality of instruction information to which the same job ID is added are successively transmitted in the order that the information is written.

(Operation of System)

Hereafter, the operation of the system according to the illustrative embodiment will now be explained with reference to FIGS. 5 to 10.

Flowcharts described herein basically indicate processes of the CPUs 41 and 61 according to instructions described in programs. That is, various processes such as "determination", "extraction", "selection", "control", etc. in the flowing explanation indicate processes of the CPUs 41 and 61. Processes by the CPU 61 include hardware control via the OS 64. Furthermore, "data" used herein is represented by a bit stream readable by a computer. Furthermore, data which has substantially the same meaning but has a different format is treated as the same data. The same applies to "information" used herein.

FIGS. 5 to 9, in particular FIGS. 6 and 7, illustrate particularly important processes in this illustrative embodiment, and in these drawings other processes executed between the respective processes are omitted. More specifically, the OS 64 may call a function (not shown) in addition to the functions illustrated in FIGS. 6 and 7. In the following explanation, only representative arguments of the arguments designated in the respective functions are explained; however, other arguments may be designated. Furthermore, in the following explanation, there are cases where particularly important process for the illustrative embodiment among the processes defined in each of called functions are explained and explanations for processes other than the particularly important processes are omitted.

First, the editing program 65 of the information processing terminal 50 displays an editing screen shown in FIG. 11A on the display 53. The editing screen includes a readout instruction icon 111, a storing instruction icon 112, a print instruction icon 113 and an editing image 114. The editing program 65 receives a user operation to the editing screen via the input I/F 54.

The readout instruction icon 111 corresponds to an instruction for reading out contents data representing the editing image 114. The storing instruction icon 112 corresponds to an instruction for storing the contents data representing the editing image 114 in the area 62B. The print instruction icon 113 corresponds to an instruction for executing the printing operation for the contents data. The editing image 114 is an image represented by page data included in the contents data. The editing program 65 according to the illustrative embodiment displays the editing mage 114 on the editing screen such that the longer side direction of the editing image 114 is along the up and down direction of the display 53.

In response to receiving a user operation to designate the readout icon 111 via the input I/F 54, the editing program 65 displays a list of the contents data having a readable format on the display 53. Then, the editing program 65 reads out the contents data designated via the user I/F 54 from the area 62B. Then, the editing program 65 displays the editing image 114 represented by the read contents data on the display 53. In response to receiving a user operation to designate editing of the editing image 114, the editing program 65 edits the contents data. In response to receiving a user operation to designate the storing instruction icon 112 via the input I/F 54, the editing program 65 stores the edited contents data in the area 67B.

In response to receiving a user operation to designate the print instruction icon 113 via the input I/F 54, the editing program 65 temporarily stores, in the area 67B, data ID identifying the contents data being edited. In the following, the data ID temporarily stored here is referred to as "designated data ID", and the contents data identified by the designated data ID is referred to as "designated contents data". In this illustrative embodiment, it is assumed that the designated data ID "CONTENTS DATA C" is temporarily stored. The editing program 65 executes the print instruction process. The print instruction process is a process for instructing the printer 10 to execute the printing operation for the designated contents data. Details about the print instruction process will now be explained with reference to FIG. 5.

(Print Instruction Process)

First, the editing program 65 secures a memory area required to store the condition information in the second area 62D of the area 62B. Further, the editing program 65 calls a readout function defined in the OS 64 while designating, as an argument, a first pointer "DEVMODE" indicating a top address of the secured memory area. As a result, the condition information stored in the first area 62C is copied by the OS 64 to the memory area indicated by the first pointer "DEVMODE". In the following, the condition information stored in the memory area secured in the second area 62D is referred to as "editing condition information".

Next, the editing program 65 displays the standard setting screen shown in FIG. 12 on the display 53 (step S11). The standard setting screen includes a pull-down menu 121, radio buttons 122, 123, 124 and 125, an "OK" icon 126, and a "CANCEL" icon 127. The editing program 65 receives a user operation to the standard setting screen via the input I/F 54 (step S12).

The pull-down menu 121 corresponds to an instruction for designating the printer 10 by which the printing operation is executed. The radio buttons 122 and 123 correspond to settings "A4" and "B5" which can be set to the size information. The radio buttons 124 and 125 correspond to settings "COLOR" and "MONOCHROME" which can be set to the color information. On the standard setting screen displayed initially, states of the radio buttons 122 to 125 correspond to the settings set in the editing condition information. The "OK" icon 126 corresponds to an instruction for instructing the printer 10 to execute the printing operation for the designated contents data in accordance with the execution condition indicated by the editing condition information. The "CANCEL" icon 127 corresponds to an instruction for finishing the print instruction process.

In response to receiving a user operation to the pull-down menu 121 via the input I/F 54, the editing program 65 stores a printer ID (hereafter, referred to as a "designated printer ID") for identifying the designated printer 10 in the area 62B. In this illustrative embodiment, it is assumed that the printer 10A identified by a printer ID "MFP-A" is designated. In response to receiving a user operation to designate the radio buttons 122 to 125 (S12: SETTING CHANGE), the editing program 65 updates the editing condition information with the setting corresponding to the designated radio buttons 122 to 125 (step S13).

Then, the editing program 65 displays, on the display 53, the standard setting screen on which the user operation is reflected (step S11). That is, the editing program 65 is able to receive, via the standard setting screen, designation of the printer 10 by which the printing operation is executed and change of the public information included in the editing condition information. On the other hand, the editing program 65 is not able to receive change of the private information included in the editing condition information.

In response to receiving designation of the "OK" icon via the input I/F 54 (S12: "OK" icon), the editing program 65 executes the StartDoc process (step S14). On the other hand, in response to receiving designation of the "CANCEL" icon 127 via the input I/F 54, the editing program 65 finishes the print instruction process although not shown in FIG. 5. The StartDoc process is a pre-process for causing the printer 10 to execute the printing operation. Details about the StartDoc process will now be explained with reference to FIG. 6.

(StartDoc Process)

First, the editing program 65 calls a function "StartDoc( )" defined in the OS 64 (Step S21). In the following, there is a case where a function called in step Sxx is referred to as a "function Sxx". The editing program 65 designates, as arguments of the function S21, the designated ID "CONTENTS DATA C", the designated printer ID "MFP-A" and the first pointer. In response to the function S21 being called, the OS 64 calls the various functions defined in the driver program 66 in particular order. Furthermore, the driver program 66 executes processes defined in the functions called by the OS 64. Details about these processes are omitted.

The OS 64 of which the function S21 is called calls the first function "DrvDocumentEvent( )" (step S22). The OS 64 designates, as arguments of the function S22, a constant "DOCUMENTEVENT_FIRST" and a second pointer. The second pointer is, for example, information indicating a top address of the first area 62C in which the condition information is stored or a top address of the memory area in which the condition information read out from the first area 62C by the OS 64 is stored.

Next, in response to the function S22 being called, the UI module 66A reads out the information stored in the memory area indicated by the second pointer, and stores the read condition information in the second area 62D (step S23), and finishes the function S22 (step S24). That is, in step S23, the UI module 66A stores the condition information read out from the first area 62C in the second area 62D. The process of step S22 executed by the driver program 66 is an example of a reference receiving process, and the process in step S23 is an example of a storing process.

In the following, the condition information stored in the second area 62D in step S23 is referred to as "saved condition information". Between the editing condition information and the saved condition information, the private information is the same, but the public information may be different. More specifically, when the editing condition information is updated in step S13, the public information is different between the editing condition information and the saved condition information.

The OS 64 of which the function S21 is called calls the first function "DrvDocumentEvent( )" (step S25). The OS 64 designates, as an argument of the function S25, a constant "DOCUMENTEVENT_STARTDOC". The process of step S25 is executed after the process of step S22. Next, in response to a function S25 being called (step S25), the UI module 66A executes the preparation instruction process (step S26). The preparation instruction process is a process for instructing the printer 10 to execute the pre-printing operation. The process of step S25 executed by the UI module 66A is an example of a print instruction receiving process in which the print instruction is received from the OS 64. Details about the preparation instruction process will be explained with reference to FIG. 8.

It is desirable that the execution instruction of the pre-printing operation with respect to the printer 10 is performed when it is certain that transmission of the print instruction information to the printer 10 occurs. After the "OK" icon 126 is designated on the standard setting screen, the print instruction information is transmitted to the printer 10 without the need for a user's instruction via the input I/F 54. That is, designation of the "OK" icon 126 can be regarded as a user's intention for instructing the printer 10 to execute the printing operation. For this reason, it is desirable that the UI module 66A executes the preparation instruction process after the "OK" icon 126 is designated on the standard setting screen.

More specifically, in response to receiving designation of the "OK" icon 126 on the standard setting screen via the input I/F 54 (S12: OK icon), the editing program 65 calls the function S21. The OS 64 may call a function defined in the UI module 66A also at a timing (e.g., a timing when the information on the printer driver is referred to) other than the timing when the function S21 is called. However, the OS 64 calls the function S25 only when the function S21 is called. For this reason, the UI module 66 according to the illustrative embodiment executes the preparation instruction process in response to the function S21 being called.

(Preparation Instruction Process)

First, the UI module 66A generates a job ID "_Preparation_" which is an example of generated identification information. Then, the UI module 66A generates a preparation job identified by the job ID "_Preparation_" (step S61). It should be noted that the UI module 66A generates a job ID such that the job ID does not overlap with a character string which can be a designated data ID. This is because the designated data ID is used as a job ID in step S29 which is described later. To various types of instruction information written to the queue area 67A in steps S62 and S66 which are described later, the job ID "_Preparation_" is added.

Next, the UI module 66A stores first preparation instruction information in the queue area 67A (step S62). The first preparation instruction information belongs to the preparation instruction information for instructing execution of the pre-printing operation, and does not include particular condition information which is described later. In other words, the first preparation instruction information is information for instructing a printer to execute the pre-printing operation of which the operation content is not changed by the particular execution condition described later. The first preparation instruction information stored in the queue area 67A is transmitted to the printer 10A by the OS 64. The process in step S62 is an example of a first instruction process where the first preparation instruction information is transmitted to the printer 10A via the communication I/F 55.

Next, the UI module 66A determines whether to transmit the particular condition information prior to print instruction information described later (step S63). The particular condition information is a part of the condition information shown in FIG. 3B. In the following, an execution condition indicated by the particular condition information is referred to as a "particular execution condition". The particular execution condition is an execution condition which varies the operation content of the pre-printing operation. As an example, the tray information indicates the particular execution condition which varies a supplying source of a sheet in a supplying process described later. As another example, the sheet information indicates the particular execution condition which varies a supplying speed of a sheet. An a further another example, the margin information indicates the particular execution condition which varies the cueing position of a sheet.

As an example, the UI module 66A may determine whether the printer 10A identified by the designated printer ID is able to execute the pre-printing operation according to the particular condition information. More specifically, the UI module 66A may receive ability information indicating whether the printer 10A is able to execute the pre-printing operation according to the particular condition information from the printer 10A via the communication I./F 55, and may determine the whether the printer 10A is able to execute the pre-printing operation based on the received ability information. Alternatively, the UI module 66A may obtain model information indicating a model of the printer 10A, and may make such a determination by comparing availability information indicating, for each model, whether a printer is able to execute the pre-printing operation according to the particular condition information with a model indicated by the obtained model information. For example, the model information may be received from the printer 10A or may be obtained from the OS 64. The ability information or the availability information may be information that indicates whether a printer is able to execute the pre-printing operation for each of a plurality of types of condition information.

As another example, the UI module 66A may receive, via the input I/F 54, a user operation designating whether to transmit the particular condition information, and may store in advance setting information indicating the received content in the area 62B. Then, the UI module 66A may determine whether to transmit the particular condition information in accordance with the content indicated in the setting information. Furthermore, the UI module 66A may receive an instruction indicating whether to transmit the particular condition information for each of the plurality of types of the condition information.

Furthermore, the UI module 66A determines whether the particular condition information is included in the saved condition information stored in the area 62B in step S23 (step S64). As an example, the condition information becoming the particular condition information may be described in advance in a source code of the UI module 66A. As another example, the UI module 66A may receive, from the printer 10A, information indicating which condition information becomes the particular condition information. Then, the UI module 66A may determine whether there is the particular condition information by comparing the information described in the source code or the information received from the printer 10A with the saved condition information. The process of step S64 is an example of a first determination process. In this illustrative embodiment, as described above, it is assumed that the tray information, the sheet information and the margin information are the particular condition information.

Furthermore, the UI module 66A determine whether the condition information determined to be the particular condition information in step S64 is the condition information which the editing program 65 is able to change (step S65).

For example, the condition information which the editing program 65 is able to change may be described in advance in the source code of the UI module 66A. Then, the UI module 66A may make such a determination by comparing the information described in the source code with the condition information determined to be the particular condition information in step S64.

As an example, the public information can be changed by the editing program 65. As another example, first private information of the private information can be changed by the editing program 65. On the other hand, second private information of the private information cannot be changed by the editing program 65. The first private information indicates a first private condition which can be changed according to editing of the public condition. The second private information indicates a second private condition which is not changed according to editing of the public condition. The process in step S65 is an example of a second determination process.

It is assumed, for example, that the size information is changed from "A4" to "B5". In this case, the rendering module 66B inquires of the printer 10A the sizes of the sheets placed on the trays 1 and 2 via the communication I/F 55. Then, in response to determining that the sheet of "B5" is supported on the tray 2, the rendering module 66B changes the tray information from "tray 1" to "tray 2". The tray information in this case is the private information.

For example, whether the private information is the first private information or the second private information may differ from the printer 10A to the printer 10B. As an example, regarding the printer 10 having the function of responding to the above described inquiry about the size of the sheet supported on each tray, the tray information is the first private information. As another example, regarding the printer 10 not having the function of responding to the above described inquiry about the size of the sheet, the tray information is the second private information. The UI module 66A may obtain, for example, the model information indicating the model of the printer 10A, and may make such a determination by comparing the information indicating, for each model, whether the tray information is the first private information with the model indicated by the obtained model information. It is assumed that the tray information, the sheet information and the margin information according to the illustrative embodiment are the second private information.

In response to determining that the particular condition information is to be transmitted previously, the particular information is included in the saved condition information and the particular condition information is the second private information (S63: Yes & S64: Yes & S65: No), the UI module 66A stores second preparation instruction information in the queue area 67A (step S66). It should be noted that the UI module 66A extracts the particular condition information from the saved condition information stored in the area 62B in step S23, and includes the extracted condition information in the second preparation instruction information.

The second preparation information belongs to the preparation instruction information for instructing execution of the pre-printing operation, and includes the particular condition information. In other words, the second preparation instruction information is information for executing the pre-printing operation of which the operation content varies depending on the particular execution condition. The second preparation instruction information stored in the queue area 67A is transmitted to the printer 10A by the OS 64. The process of step S66 is an example of a second instruction process in which the second preparation instruction information is transmitted to the printer 10A via the communication I/F 55.

As an example, when there are a plurality of particular condition information, the UI module 66A may store one second preparation instruction information including all of the plurality of particular condition information in the queue area 67A. As another example, when there are a plurality of particular condition information, the UI module 66A may store a plurality of second preparation instruction information each of which includes one particular condition information in the queue area 67A. In this case, the plurality of second preparation instruction information are stored in the queue area 67A in the order that the corresponding pre-printing operation is executed. In this illustrative embodiment, it is assumed that the second preparation instruction information including the tray information, the second preparation instruction information including the sheet information and the second preparation instruction information including the margin information are stored in the queue area 67A in this order.

On the other hand, in response to determining that the particular condition information is not transmitted (S63: No), in response to determining that the particular condition information is not included in the saved condition information (64: No), or in response to determining that the particular condition information is the public information or the first private information (S65: Yes), the UI module 66A finishes the preparation instruction process without executing the process of step S66.

Returning to FIG. 6, the UI module 66A finishes the function S25 (step S27). Next, in response to the function S25 being finished (step S27), the OS 64 calls a second function "DrvStartDoc( )" defined in the rendering module 66B (step S28). The OS 64 designates, as arguments of the function S28, the first pointer and the designated data ID "CONTENTS DATA C" designated as an argument in step S21.

Next, in response to the function S28 being called, the rendering module 66B generates, in the queue area 67A being the designated queue, a print job having the job ID being the designated data ID "CONTENTS DATA C" designated as an argument (step S29), and finishes the function S28 (step S30). To the various types of instruction information written to the queue area 67A in steps S25, S48 and S53 described later, the job ID "CONTENTS DATA C" is added. However, it this stage, the print job identified by the job ID "CONTENTS DATA C" does not include the instruction information. The designated data ID designated as an argument of the function S28 is an example of designated identification information designated by the OS 64.

In response to the function S28 being finished (step S30), the OS 64 calls the first function "DrvDocumentEvent ( )" (step S31). The OS 64 designates a constant "DOCUMENTEVENT_STARTDOCPOST" as an argument of the function S31. Next, in response to the function S31 being called, the UI module 66A executes an instruction cancelling process (step S32).

The instruction cancelling process is a process where the preparation instruction information added to the preparation job is deleted from the queue area 67A. More specifically, the UI module 66A determines whether the instruction information to which the job ID "_Preparation_" stored temporarily in step S64 is added is stored in the queue area 67A. The case where the preparation instruction information is stored in the queue area 67A in step S66 is, for example a case where the communication I/F 55 is not connected to a communication line or a case where the printer 10A is turned OFF. Then, in response to determining that the preparation instruction information is stored in the queue area 67A, the UI module 66A deletes the preparation instruction information from the queue area 67A.

Returning to FIG. 6, the UI module 66A finishes the function S31 (step S33). Furthermore, in response to the function S31 being finished (step S33), the OS 64 finishes the function S21 (step S34). Thus, the StartDoc process is finished. Returning to FIG. 5 subsequently to the function S21, the editing program 65 executes a StartPage process (step S15). The StartPage process is a process where the print instruction information is generated. The StartPage process is executed for each page data included in the designated contents data. For example, page data targeted by the StartPage process is designated as an argument of a function by the editing program 65. The StartPage process will now be explained with reference to FIG. 7.

(StartPage Process)

The editing program 65 calls a function "StartPage( )" defined in the OS 64 (step S41). Then, the OS 64 calls the first function "DrvDocumentEvent( )" (step S42). The OS 64 designates, as an argument, a constant "DOCUMENT-EVENT_STARTPAGE". Then, the UI module 66A finishes the function S42 while executing a particular process (step S43).

In response to the function S42 being finished (step S43), the OS 64 calls a function "DrvStartPage( )" defined in the rendering module 66B (step S44). Next, in response to the function S44 being called, the rendering module 66B determines consistence between the public information and the first private information in the editing condition information indicated by the first pointer. Then, in response to determining, for example, that the public information is not consistent with the first private information as described above, the rendering module 66B changes the first private information so as to be consistent with the public information.

The rendering module 66B generates header instruction information, and stores the generated header instruction information in the queue area 67A (step S45). The header instruction information is print instruction information for instructing the operation to be executed before recording an image on the sheet in a series of operation for recording an image on one sheet. The header instruction information according to the illustrative embodiment is the supply instruction information and the cueing instruction information.

In response to transmitting the second preparation instruction information including the tray information and the sheet information in step S66, the rendering module 66B may omit transmission of the supply instruction information in step S45. Further, in response to transmitting the second preparation instruction information including the margin information in step S66, the rendering module 66B may omit transmission of the cueing instruction information in step S45.

Then, the rendering module 66B finishes the function S44 (step S46). Next, in response to the function S44 being finished (step S46), the OS 64 finishes the function S41 (step S47). Then, in response to the function S41 being finished (step S47), the editing program 65 calls a drawing function defined in the OS 64. Further, in response to the drawing function being called by the editing program 65, the OS 64 calls a drawing function defined in the rendering module 66B.

By executing a plurality of drawing functions in particular order, the rendering module 66B generates print data from the page data. The print data is, for example, raster data obtained by rasterizing the page data. The rendering module 66B generates instruction information for instructing execution of the printing operation for the print data, and stores the generated print instruction information in the queue area 67A (step S48). As described later, in the step S48, the ejecting instruction information and the conveying instruction information are generated. The process for generating the print data in step S48 is an example of a generating process. In the following, details about the process in which the rendering module 66B generates the print instruction information are explained.

First, the rendering module 66B notifies the OS 64 of unit information indicating a unit of data passed as a target for the rasterizing at a particular timing after the step S28. In the unit information, for example, "page" indicating transfer in a page data unit or "band" indicating transfer in a band data unit is set. The band data is partial data of the page data. More specifically, the page data is divided into a plurality of band data adjoining in the longer side direction. An image indicated by the band data has a larger area than an image indicated by pass data which is described later.

In response to, for example, a particular size (e.g., A4) being set in the size information of the editing condition information, the rendering module 66B notifies the OS 64 of the unit information "page". A sheet having the particular size is conveyed by the rollers 24, 25 and 26 of the printer 10 in a state where the shorter side direction of the sheet coincides with the conveying direction. On the sheet having the particular size, an image is recorded by the carriage 27 of the printer 10 moving in the longer side direction of the sheet.

On the other hand, for example, in response to a non-particular size (e.g., a size other than A4) being set in the size information of the editing condition information, the rendering module 66B notifies the OS 64 of the unit information "band". A sheet having the non-particular size is conveyed by the rollers 24, 25 and 26 of the printer 10 in a state where the longer side direction of the sheet coincides with the conveying direction. On the sheet having the non-particular size, an image is recorded by the carriage 27 of the printer 10 moving in the shorter side direction of the sheet.

It should be noted that the unit information may be notified as a return value of the function called by the OS 64. For example, the particular size may differ from the printer 10A to the printer 10B. The particular size for each of the printers 10A and 10B may be described in the source code of the driver program 66, or the driver program 66 may inquire of the printers 10A and 10B the particular size.

The OS 64 which has obtained the unit information "page" passes the page data to the rendering module 66B in step S48. The rendering module 66B rasterizes the entire page data passed from the OS 64 to generate raster data. Then, the rendering module 66B rotates the raster data developed in the area 62B by 90 degrees in the area 62B. Then, the rendering module 66B extracts a plurality of pass data indicating an image recorded in one of recording areas from the raster data which has been rotated by 90 degrees. Then, the rendering module 66B generates the ejecting instruction information and the conveying instruction information for each of the extracted pass data, and writes sequentially the generated ejecting instruction information and the conveying instruction information in the queue area 67A. The rendering module 66B executes successively, for all the pass data included in the page data, extraction of the pass data, generating of the ejecting instruction information and the conveying instruction information, and writing of the generated information in the queue area 67A.

On the other hand, the OS 64 which has obtained the unit information "band" passes one of the plurality of band data included in the page data to the rendering module 66B. The rendering module 66B rasterizes the entire band data passed from the OS 64 to generate raster data. Then, the rendering module 66B generates the ejecting instruction information and the conveying instruction information based on the raster data, and writes the generated ejecting instruction information and the conveying instruction information in the queue area 67A. Then, the above described process is repeated for all the band data constituting the page data.

That is, in the case of the unit information "page", the initial ejecting instruction information is written in the queue area 67A after the entire page data is converted into the raster data and the raster data is rotated by 90 degrees in the area 62B. On the other hand, in the case of the unit information "band", the initial ejecting instruction information is written in the queue area 67A after the entire band data being a part of the page data is converted into the raster data. That is, the time period elapsing from the time when the "OK" icon is designated to the time when the initial ejecting instruction information is written in the queue area 67A is longer in the case of the unit information "page" than that in the case of the unit information "band".

Next, in response to the process of step S48 for the designated page data being finished, the editing program 65 calls a function "EndPage( )" defined in the OS 64 (step S49). Next, the OS 64 calls the first function "DrvDocumentEvent( )" (step S50). The OS 64 designates, as an argument of the function S50, a constant "DOCUMENT-EVENT_ENDPAGE". Then, the UI module 66A executes a particular process and finishes the function S50 (step S51).

Next, in response to the function S50 being finished (step S51), the OS 64 calls a function "DrvEndPage( )" defined in the rendering module 66B (step S52). Then, in response to the function S52 being called, the rendering module 66B generates the discharge instruction information, and stores the generated discharge instruction information in the queue area 67A (step S53).

The plurality of print instruction information written in the queue area 67A by the StartPage process shown in FIG. 7 are transmitted, in the order that they are written, to the printer 10A by the OS 64. Typically, the OS 64 transmits the supply instruction information, the cueing instruction information, the ejecting instruction information, the conveying instruction information, the ejecting instruction information, . . . , the discharge instruction information to the printer 10A in this order via the communication I/F 55. The process of step S45, the process for storing the print instruction information in the queue area 67A in step S48, and the process of step S53 are an example of the print instruction process for transmitting the print instruction information to the printer 10 via the communication I/F 55.

Then, the rendering module 66B finishes the function S52 (step S54). Then, in response to the function S52 being finished (step S54), the OS 64 finishes the function S40 (step S55). As a result, the StartPage process is finished. Next, returning to FIG. 5, the editing program 65 determines whether the StartPage process has been executed for all the page data included in the designated contents data (step S16). Then, in response to determining that there is page data for which the StartPage process has not been executed (S16: Yes), the editing program 65 executes the StartPage process for the page data (step S15).

Then, in response to determining that the StartPage process has been executed for all the page data (S16: No), the editing program 65 executes an EndDoc process (step S17). The EndDoc process is a rear-stage process executed after the printing operation is executed by the printer 10. Since the EndDoc process is a known process which is started by letting the editing program 65 call a function "EndDoc( )" defined in the OS 64, detailed explanation thereof is omitted.

(Print Process)

Hereafter, the print process executed by the printer 10 will be explained with reference to FIG. 9. The printer 10 executes the print process in response to receipt of the preparation instruction information or the print instruction information from the information processing terminal 50 via the communication I/F 15. Processes described below may be executed by the CPU 41 by reading the program stored in the ROM 42 or may be implemented as hardware circuit mounted on the control unit 40.

The control unit 40 of the printer 10 receives the preparation instruction information from the information processing terminal 50 via the communication I/F 15 (S71: PREPARATION INSTRUCTION). The control unit 40 according to the illustrative embodiment receives the first preparation instruction information, the second preparation instruction information including the tray information, the second preparation instruction information including the sheet information, the second preparation instruction information including the margin information from the information processing terminal 50 via the communication I.F 15 in this order. A process for receiving the preparation instruction information in step S71 is an example of a preparation instruction information receiving process, a process for receiving the first preparation instruction information is an example of a first receiving process, and a process for receiving the second preparation instruction information is an example of a second receiving process.

Next, in response to the preparation instruction information being received (S71: PREPARATION INSTRUCTION), the printer 10 determines whether the power supply unit 11 is in a sleep state (step S72). For example, the control unit 40 may store flag information indicating a current status of the power supply unit 11 in the RAM 43 or the EEPROM 44 and may make a determination in step S72 based on the flag information. However, the determination manner in step S72 is not limited to the above described example.

Next, in response to determining that the power supply unit 11 is the sleep state (S72: Yes), the control unit 40 switches the power supply unit 11 from the sleep state to a driving state (step S73). More specifically, the control unit 40 outputs a power signal of a HIGH level to the power supply unit 11. On the other hand, in response to determining that the power supply unit 11 is the driving state (S72: No), the control unit 40 skips the process of step S73. The process of step S72 is an example of a state determination process, and the process of step S73 is an example of a switching process.

Next, the control unit 40 notifies, through the display 13, that the preparation instruction information is received (step S74). For example, the control unit 40 may turn on a back light of the display 13 for a particular time period. The process of step S74 is an example of a notifying process. The display 13 is an example of a notifying unit. However, a concrete example of the notifying process is not limited to the above described example. For example, as the notifying process, an LED lamp (not shown) may be turned on, or notifying sound may be output from a speaker (not shown).

Next, the control unit 40 causes the operating unit 20 to execute the pre-printing operation (step S75). The pre-printing operation is the operation which the printer 10 should execute for recording an image having particular quality in the printing operation. Details of the print process for causing the operating unit 20 to execute the pre-printing operation will now be explained with reference to FIG. 10. It is assumed that, at a time of execution of the pre-printing operation, the carriage 27 is at the cap position, the cap 31 is at the covering position and the driving force transmission mechanism 35 is in the third state.

In response to receiving the first preparation instruction information from the information processing terminal 50 via the communication I/F 15, the control unit 40 moves the cap 31 from the covering position to the separated position (step S91). Then, the control unit 40 moves the carriage 27 from the cap position to the flushing position (step S92). At this time, the driving force transmission mechanism 35 is switched from the third state to the first state due to the fact that the carriage 27 moving from the cap position to the flushing position is separated from the sliding member 36. The process of step S91 is an example of a separating process, and the process of step S92 is an example of a moving process and a first switching process. The process of steps S91 and S92 is an example of a first pre-printing process where the operating content is not changed by the particular condition information.

Next, in response to receiving the second preparation instruction information including the tray information from the information processing terminal 50 via the communication I/F 15, the control unit 40 makes a determination on the setting of the tray information (step S93). Then, in response to determining that "tray 2" is set in the tray information (S93: SECOND TRAY), the control unit 40 switches the driving force transmission mechanism 35 from the first state to the second state by letting the carriage 27 to separate from and contact the sliding member 36 (step S94). Further, the control unit 40 moves again the carriage 27 to the flushing position. On the other hand, in response to determining that "tray 1" is set in the tray information (S93: FIRST TRAY), the control unit 40 skips the step S94. The process of step S94 is an example of a second switching process.

Then, in response to receiving the second preparation information including the sheet information from the information processing terminal 50 via the communication I/F 15, the control unit 40 makes a determination on the setting of the sheet information (step S95). Then, in response to determining that the "PLAIN PAPER" is set in the sheet information (S95: PLAIN PAPER), the control unit 40 causes the supply rollers 24 and 25 to supply the sheet supported on the first supply tray or the second supply tray toward the conveying roller 26 at a $1^{st}$ speed (step S96). On the other hand, in response to determining that "GLOSSY PAPER" is set in the sheet information (S95: GLOSSY PAPER), the control unit 40 causes the supply rollers 24 and 25 to supply the sheet supported on the first supply tray or the second supply tray toward the conveying roller 26 at a $2^{nd}$ speed (step S97).

Regarding glossy paper which is thicker than plain paper, it is desirable that the glossy paper is supplied at a low speed while applying torque thereto so as to suppress jamming caused when passing through a curved conveying path. That is, the $2^{nd}$ speed is slower than the $1^{st}$ speed. The sheet information "PLAIN PAPER" is an example of a first type, and the sheet information "GLOSSY PAPER" is an example of a second type of which the thickness of the sheet is greater than that of the first type. The process of steps S96 and S97 is an example of a supplying process.

Next, in response to receiving the second preparation instruction information including the margin information from the information processing terminal via the communication I/F 15, the control unit 40 makes a determination on the setting of the margin information (step S98). Then, in response to determining that "BORDERLESS" indicating that a margin is not provided is set in the margin information (S98: BORDERLESS), the control unit 40 causes the conveying roller 26 to convey the sheet in the conveying direction until the leading edge of the sheet reaches a first position (step S99). On the other hand, n response to determining that "BORDERED" indicating a margin is provided is set in the margin information (S98: BORDERED), the control unit 40 causes the conveying roller 26 to convey the sheet in the conveying direction until the leading edge of the supplied sheet reaches a second position (step S100).

The second position is on a downstream side in the conveying direction with respect to the first position. The distance between the first position and the second position is, for example, a value (e.g., 3 mm) set preliminary in the driver program or the printer 10 as a margin provided at a leading edge of a sheet. The process of steps S99 and S100 is an example of a cueing process in which a sheet is conveyed by the conveying roller 26 to a position facing the carriage 27. The process of steps S93 to S100 is an example of a second pre-printing process of which the operation content varies depending on the particular condition information.

On the other hand, in response to not receiving the second preparation instruction information including the tray information (S93: NOT RECEIVED), the control unit 40 finishes the pre-printing process without executing the processes of steps S94 to S100. In response to not receiving the second preparation instruction information including the sheet information (S95: NOT RECEIVED), the control unit finishes the pre-printing process without executing the processes of steps S96 to S100. Further, in response to not receiving the second preparation instruction information including the margin information (S98: NOT RECEIVED), the control unit 40 finishes the pre-printing process without executing the processes of steps S99 to S100.

The control unit 40 stores the flag information corresponding respectively to a plurality of pre-printing operations in the RAM 43 or the EEPROM 44. In all the flag information, a second value "OFF" indicative of the fact that the pre-printing operation is not finished is set at a time of start of the pre-printing process. In response to the fact that one of the pre-printing operations is finished, the control unit 40 sets a first value "ON" indicative of the fact that pre-printing operation is finished to the flag information corresponding to the finished pre-printing operation.

Returning to FIG. 9, the control unit 40 receives the print instruction information from the information processing terminal 50 via the communication I/F 15 (S71: PRINT INSTRUCTION). That is, the control unit 40 according to the illustrative embodiment receives the supply instruction information, the cueing instruction information, the ejecting instruction information, the conveying instruction information, the ejecting instruction information, . . . , the discharge instruction information from the information processing terminal 50 via the communication I/F 15 in this order. The process where the print instruction information is received in step S71 is an example of a print instruction receiving process.

The supply instruction information is information causing the supply rollers 24 and 25 to supply a sheet from the supply tray indicated by the tray information of the editing condition information. The cueing instruction information is information for causing the conveying roller 26 to convey a sheet to a position at which an initial recording area of the supplied sheet faces the recording head 28. The ejecting instruction information is information indicating the timing when the recording head 28 ejects the ink to record an image in a recording area of a sheet facing the recording head 28. The conveying instruction information is information for causing the conveying roller 26 to convey a sheet to a position at which a recording area on which an image is to be recorded next faces the recording head 28. The discharge instruction information is information for causing the conveying roller 26 to discharge a sheet on which an image has been recorded.

Next, the control unit 40 determines whether the pre-printing process is finished (step S76). More specifically, in response to determining that the first value "ON" is set to all the flag information associated with the pre-printing operations, the control unit 40 determines that the pre-printing process is finished (S76: Yes). On the other hand, in response to determining that the second value "OFF" is set to at least one of the flag information associated with the pre-printing operations, the control unit 40 determines that the pre-printing process is not finished (S76: No).

An interval between receipt of the preparation instruction information and receipt of the print instruction information varies depending on, for example, a processing amount of step S48, a status of the communication network, etc. That is, there is a possibility that the pre-printing process started by the preparation instruction information as a trigger is not finished at a time when the print instruction information is received. Further, there is a possibility that, when the control unit 40 has not received the second preparation instruction information, the control unit 40 has not executed a part of the second pre-printing process. The process of step S76 is an example of a determination process.

In response to determining that at least one of the pre-printing operations to be executed in the pre-printing process has not been executed (S76: No), the control unit 40 causes the operating unit 20 to execute unexecuted pre-printing operation (step S77). More specifically, in response to the process of steps S93 to S97 being not executed, the control unit 40 executes a process corresponding to the steps S93 to S97 according to the received supply instruction information. Further, in response to the process of steps S98 to S10 being not executed, the control unit 40 executes a process corresponding to the steps S98 to S100 according to the received cueing instruction information.

On the other hand, in response to determining that all the pre-printing operations to be executed in the pre-printing process have been executed (S76: Yes), the control unit 40 skips step S77. Further, in response to the fact that the processes of steps S93 to S97 have been executed and the supply instruction information has been received, the control unit 40 does not execute the process according to the received supply instruction information. Similarly, in response to the fact that the processes of steps S98 to S100 have been executed and the cueing instruction information has been received, the control unit 40 does not execute the process according to the received cueing instruction information.

Next, the control unit 40 causes the recording head 28 of the carriage 27 disposed at the flushing position to eject ink toward the ink receiving unit 33 (step S78). The process of step S78 is an example of a flushing process. That is, the flushing process according to the illustrative embodiment is executed in response to the fact that the print instruction information has been received and all the pre-printing operations have been executed. However, the flushing process may be executed before the print instruction information is received and after step S92 or step S94 is executed. Then, in response to the flushing process being finished, the control unit 40 causes the operation unit 20 to execute the printing operation (steps S79 to S82). The printing operation is the operation where an image represented by the print data is recorded on a sheet according to the execution condition indicated by the print instruction information. The process of steps S79 to S82 is an example of a print process.

The control unit 40 executes an ejecting process according to the received ejecting instruction information (step S79). That is, the control unit 40 causes the recording head 28 to eject ink at ejecting timings indicated by the ejecting instruction information while causing the carriage 27 to move from one side to the other side in the main scanning direction. Then, the control unit 40 determines whether an image has been recorded on all the recording areas of the sheet (step S80). In other words, the control unit 40 determines which of the ejecting instruction information and the discharge instruction information is received subsequently to the ejecting instruction information used in the immediately preceding step S79.

In response to determining that the image has not been recorded in all the recording areas of the sheet (S80: No), the control unit 40 executes a conveying process according to the received conveying instruction information (step S81). That is, the control unit 40 causes the conveying roller 26 to convey the sheet by a conveying amount indicated by the conveying instruction information. The control unit 40 repeats the process of steps S79 to S81 until the image is recorded in all the recording areas of the sheet (S80: No).

In response to determining that the image has been recorded in all the recording areas of the sheet (S80: Yes), the control unit 40 executes a discharging process according to the received discharge instruction information (step S82). That is, the control unit 40 causes the conveying roller 26 to discharge, to the outside of the printer 10, the sheet on which the image has been recorded. It should be noted that, when a plurality of page data is included in the designated contents data, the process of steps S78 to S82 is executed repeatedly. As a result, the image represented by the print data generated in step S48, i.e., the image represented by the designated contents data, is recorded on the sheet.

(Advantageous Effects of the Illustrative Embodiment)

According to the above describe illustrative embodiment, the preparation instruction information including the particular condition information is transmitted prior to the print instruction information. Further, since the particular condition information is extracted from the saved condition information, the particular execution condition is extracted from the execution condition used actually for the printing operation. As a result, it becomes possible to cause a printer to execute the pre-printing operation, of which the operation content varies depending on the particular execution condition, so that appropriate operation content is processed in the pre-printing operation prior to receipt of the print instruction information.

Further, according to the above described illustrative embodiment, it becomes possible to start the pre-printing operation of which the operation content does not vary depending on the particular execution condition in response to the first preparation instruction information as a trigger, and to start the pre-printing operation of which the operation content varies depending on the particular execution condition in response to the second preparation instruction information as a trigger. That is, it becomes possible to cause a printer to execute the pre-printing operation having appropriate operation content at an appropriate timing prior to receipt of the print instruction information.

Furthermore, since the second pre-printing process is executed according to the supply instruction information, the cueing instruction information, etc. when the second preparation instruction information is not transmitted, it becomes possible to record an image having particular quality on a sheet. Furthermore, since the flushing process is executed after receipt of the print instruction information, it becomes possible to shorten a standby time from termination of the flushing process to start of the print process. As a result, it becomes possible to suppress decrease of quality of image recording.

According to the above described illustrative embodiment, since whether to transmit the preparation instruction information is determined at a timing when the function S25 is executed, it becomes possible to prevent unnecessary pre-printing operation from being executed by the printer 10. That is, it is possible to instruct the printer 10 to execute the pre-printing operation at an appropriate timing. Furthermore, since the print data is generated on the information processing terminal 50 while the printer 10 executes the pre-printing operation according to the preparation instruction information, it becomes possible to shorten FPOT (First Print Out Time) which is a required time elapsing from designation of the "OK" icon on the standard setting screen until an initial sheet is discharged from a printer.

Furthermore, when an image is formed by the printer 10 for a sheet having the particular size, print data is generated after the longer side direction and the shorter side direction of the designated contents data is reversed. Therefore, in this case, the generating process may take a longer time in comparison with the case where an image is recorded on a sheet having the non-particular size. In this respect, according to the above described configuration, by executing concurrently the generating process by the information processing terminal 50 and the pre-printing process by the printer 10, it becomes possible to shorten the FPOT. Furthermore, by executing, as described above, concurrently the generating process by the information processing terminal 50 and the switching process by the printer 10, the FPOT can be further shortened.

According to the above described illustrative embodiment, the fact that the preparation instruction information is received by the printer 10 is notified through the notifying unit. As a result, it becomes possible to let a user who has instructed execution of the printing operation recognize that a printer has started the operation.

According to the above described illustrative embodiment, the printer 10 is configured to convey the sheet having A4 size in the shorter side direction of the sheet. Such a configuration provides advantages that a time elapsed from the start of conveying of the sheet to completion of printing for one page can be decreased in comparison with the case where the sheet is conveyed in the longer side direction of the sheet. Furthermore, the printer 10 according to the above described illustrative embodiment is provided with a configuration in which the pre-printing operation is executed through use of the time for creating the print data in order to convey the sheet in the shorter side direction of the sheet. Therefore, the time required to complete the printing for one page as well as FPOT can be decreased.

In the above described illustrative embodiment, an example where the processes executed by the control unit are implemented by causing the CPUs 41 and 61 to execute the various programs stored in the ROM 42 or the memory 62 on the printer 10 and the information processing terminal 50 according to the illustrative embodiment. However, the configuration of the control unit is not limited to such an example, and a part or all of the processes may be implemented by hardware such as an integrated circuit.

Further, aspects of the present disclosure achieved as the printer 10 and the information processing terminal 50 may be implemented as programs that cause the printer 10 and the information processing terminal 50 to perform the processes. The programs may be provided as being stored in non-transitory computer-readable media including but not limited to RAMs, ROMs, flash memories, EEPROMs, CD-media, DVD-media, hard disk drives, floppy drives, and storage coupled with a server that is connectable with the printer 10 and the information processing terminal 50 via a communication network. The programs may be delivered as information or signals indicating the programs, via the communication network such as the Internet.

What is claimed is:
1. A printer, comprising:
a printing unit configured to execute a printing operation to record an image on a sheet in accordance with an execution condition and to execute at least one pre-printing operation for recording an image having particular quality on the sheet in the printing operation;
a communication interface; and
a controller configured to:
  receive preparation instruction information from an information processing terminal via the communication interface, the preparation instruction information instructing execution of at least a part of the at least one pre-printing operation, the preparation instruction information including particular condition information indicating a particular execution condition, the particular execution condition being the execution condition changing operation content of the at least one pre-printing operation, the preparation instruction information not including print data for recording the image;
  in response to receiving the preparation instruction information, cause the printing unit to execute the at least one pre-printing operation of which the operation content accords with the particular execution condition;
  receive print instruction information from the information processing terminal via the communication interface, the print instruction information instructing execution of the printing operation according to the execution condition, the preparation instruction information and the print instruction information are separately received;
  in response to receiving the print instruction information, determine whether the at least one pre-printing operation has already been executed; and
  in response to determining that the at least one pre-printing operation has been executed, cause the printing unit to execute the printing operation indicated by the print instruction information, the printing operation being executed based on the print data and the execution condition.

2. The printer according to claim 1,
wherein, the controller is further configured to:
receive first preparation instruction information not including the particular condition information from the information processing terminal via the communication interface; and
receive second preparation instruction information including the particular condition information from the information processing terminal via the communication interface,
in response to receiving the first preparation instruction information, cause the printing unit to execute the at least one pre-printing operation of which the operation content is not changed by the particular condition information; and
in response to receiving the second preparation instruction information, cause the printing unit to execute the at least one pre-printing operation of which the operation content is changed by the particular condition information.

3. The printer according to claim 2,
wherein:
the print instruction information includes condition information indicating the execution condition; and
in response to determining that the printing unit has not executed the at least one pre-printing operation of which the operation content is changed by the particular condition information, the controller is further configured to, prior to the causing the printing unit to execute the printing operation, cause the printing unit to execute the at least one pre-printing operation of which the operation content is changed by the particular condition information using the condition information included in the print instruction information.

4. The printer according to claim 2,
wherein the printing unit comprises:
a tray configured to support a sheet;
a supply roller configured to supply the sheet supported on the tray;
a conveying roller configured to convey, in a conveying direction, the sheet supplied by the supply roller;
a carriage configured to move, in a main scanning direction intersecting with the conveying direction, in an area including a sheet facing area facing the sheet conveyed by the conveying roller;
a recording head configured to eject ink from nozzles, the recording head being mounted on the carriage; and
a cap disposed to face the carriage at a cap position which is deviated to one side in the main scanning direction from the sheet facing area, the cap being configured to move between a covering position where the cap closely contacts the recording head and covers the nozzles and a separated position where the cap is separated from the recording head,
wherein:
the controller is further configured to cause the cap to move from the covering position to the separated position when causing the printing unit to execute the at least one pre-printing operation of which the operation content is not changed by the particular condition information; and
the controller is further configured to cause the supply roller to supply the sheet supported on the tray to a position reaching the conveying roller, when causing the printing unit to execute the at least one pre-printing operation of which the operation content is changed by the particular condition information.

5. The printer according to claim 4,
wherein the particular condition information includes sheet information indicating a type of the sheet on which an image is recorded,
wherein the controller is configured to:
cause the supply roller to supply the sheet at a first speed when the sheet information indicates a first type; and
cause the supply roller to supply the sheet at a second speed slower than the first speed when the sheet information indicates a second type of which thickness is greater than that of the first type.

6. The printer according to claim 4,
wherein the tray comprises a first tray and a second tray;
wherein the supply roller comprises:
a first supply roller configured to supply a sheet supported on the first tray; and
a second supply roller configured to supply a sheet supported on the second tray,
wherein the printing unit comprises a motor configured to rotate the first supply roller and the second supply roller,
wherein:
the particular condition information includes tray information indicating the first tray or the second tray; and
wherein the controller is configured to cause the motor to rotate the second supply roller when the tray information indicates the second tray without rotating the first supply roller.

7. The printer according to claim 4,
wherein:
the particular condition information includes margin information indicating whether to set a margin in an outer periphery of the sheet; and
wherein the controller is configured to cause the conveying roller to convey the sheet to a position facing the carriage, when causing the printing unit to execute the at least one pre-printing operation of which the operation content is changed by the particular condition information,
wherein the sheet is conveyed to a first position when the margin information indicates not setting the margin and the sheet is conveyed to a second position on a downstream side with respect to the first position in the conveying direction when the margin information indicates setting the margin.

8. The printer according to claim 4,
wherein the printing unit comprises an ink receiving unit configured to receive ink ejected from the nozzles, the ink receiving unit being disposed to face the carriage at a flushing position which is deviated to another side in the main scanning direction from the sheet facing area,
wherein the controller is configured to cause the carriage to move separated from the cap from the cap position to the flushing position when causing the printing unit to execute the at least one pre-printing operation of which the operation content is not changed by the particular condition information, and
in response to receiving the print instruction information, cause the recording head to eject ink toward the ink receiving unit prior to execution of the printing operation.

* * * * *